(12) United States Patent
Smith

(10) Patent No.: US 10,804,710 B2
(45) Date of Patent: Oct. 13, 2020

(54) BIDIRECTIONAL ENERGY CONVERTER WITH CONTROLLABLE FILTER STAGE

(71) Applicant: STEM, INC, Millbrae, CA (US)

(72) Inventor: Lynn Smith, San Mateo, CA (US)

(73) Assignee: STEM, INC, Millbrae, CA (US)

(*) Notice: Subject to any disclaimer, the term of this patent is extended or adjusted under 35 U.S.C. 154(b) by 233 days.

(21) Appl. No.: 14/590,925

(22) Filed: Jan. 6, 2015

(65) Prior Publication Data

US 2015/0123601 A1    May 7, 2015

Related U.S. Application Data

(62) Division of application No. 12/731,070, filed on Mar. 24, 2010, now Pat. No. 8,971,057.

(Continued)

(51) Int. Cl.
*H02J 1/06*     (2006.01)
*H02M 3/335*    (2006.01)
(Continued)

(52) U.S. Cl.
CPC .......... *H02J 7/00* (2013.01); *H02M 3/33584* (2013.01); *H02M 7/797* (2013.01)

(58) Field of Classification Search
CPC ..... H02M 3/33589; H02M 3/335–338; H02M 3/33584; H02M 7/00; H02M 7/81;
(Continued)

(56) References Cited

U.S. PATENT DOCUMENTS

| 3,487,289 A | 12/1969 | McMurray |
| 4,121,147 A | 10/1978 | Becker et al. |

(Continued)

FOREIGN PATENT DOCUMENTS

| EP | 2101403 A2 | 9/2009 |
| EP | 2 204 658 A1 | 7/2010 |

(Continued)

OTHER PUBLICATIONS

Cha et al. "A New Soft Switching Direct Converter for Residential Fuel Cell Power System", IAS 2004. 2:1172-1177.

(Continued)

*Primary Examiner* — Thienvu V Tran
*Assistant Examiner* — Nusrat Quddus
(74) *Attorney, Agent, or Firm* — Artegis Law Group, LLP

(57) ABSTRACT

The invention provides a bidirectional converter that operates under an AC generation mode or a charge mode. The bidirectional converter may be a single component or circuit, which may include a DC-DC conversion stage using a unique "Smith 2 Stage conversion" technique and a DC-AC conversion stage or AC-DC conversion stage using a switchable filter depending on the mode. During the charge mode, the converter may be able to control the voltage and current of the DC output using a software algorithm, to match the battery being charged, or the DC receiver. This may enable the converter to control the nature of the DC output so it can be adapted to any energy storage technology. The controllable output voltage and synchronizable frequency may allow the converter to be used in series combinations to achieve a variety of high voltage outputs from simpler building blocks.

8 Claims, 17 Drawing Sheets

Related U.S. Application Data

(60) Provisional application No. 61/163,214, filed on Mar. 25, 2009.

(51) Int. Cl.
*H02J 7/00* (2006.01)
*H02M 7/797* (2006.01)

(58) Field of Classification Search
CPC ........ H02M 7/757; H02M 7/77; H02M 7/797; H02J 7/00; H02J 1/06
USPC ...... 363/15–19, 39–41, 44–55, 56.01–56.04, 363/74, 82, 97, 98, 123, 140
See application file for complete search history.

(56) References Cited

U.S. PATENT DOCUMENTS

| | | | |
|---|---|---|---|
| 4,287,465 A | 9/1981 | Godard et al. | |
| 4,302,717 A | 11/1981 | Olla | |
| 4,399,396 A | 8/1983 | Hase | |
| 4,559,590 A | 12/1985 | Davidson | |
| 4,752,697 A | 6/1988 | Lyons et al. | |
| 4,847,745 A | 7/1989 | Shekhawat et al. | |
| 4,996,637 A | 2/1991 | Piechnick | |
| 5,262,931 A | 11/1993 | Vingsbo | |
| 5,274,571 A | 12/1993 | Hesse et al. | |
| 5,343,079 A | 8/1994 | Mohan et al. | |
| 5,369,353 A | 11/1994 | Erdman | |
| 5,510,700 A | 4/1996 | Pomatto | |
| 5,594,318 A | 1/1997 | Nor et al. | |
| 5,595,506 A | 1/1997 | Robinson et al. | |
| 5,598,092 A * | 1/1997 | Ohtsuka | G05F 1/652 323/222 |
| 5,620,337 A | 4/1997 | Pruehs | |
| 5,625,543 A | 4/1997 | Barrett | |
| 5,909,367 A | 6/1999 | Change | |
| 6,015,314 A | 1/2000 | Benfante | |
| 6,018,203 A | 1/2000 | David et al. | |
| 6,059,605 A | 5/2000 | Robinson et al. | |
| 6,160,722 A | 12/2000 | Thommes et al. | |
| 6,172,480 B1 | 1/2001 | Vandelac | |
| 6,200,158 B1 | 3/2001 | Robinson | |
| 6,268,715 B1 | 7/2001 | Oglesbee et al. | |
| 6,301,132 B1 | 10/2001 | Vandelac | |
| 6,310,789 B1 | 10/2001 | Nebrigic et al. | |
| 6,344,985 B1 | 2/2002 | Akerson | |
| 6,388,421 B2 | 5/2002 | Abe | |
| 6,404,655 B1 | 6/2002 | Welches | |
| 6,420,801 B1 | 7/2002 | Seefeldt | |
| 6,424,119 B1 | 7/2002 | Nelson et al. | |
| 6,429,625 B1 | 8/2002 | LeFevre et al. | |
| 6,522,031 B2 | 2/2003 | Provanzana et al. | |
| 6,587,362 B1 | 7/2003 | Vithayathil | |
| 6,606,552 B2 | 8/2003 | Haimerl et al. | |
| 6,624,533 B1 * | 9/2003 | Swanson | H02P 9/307 307/46 |
| 6,639,383 B2 | 10/2003 | Nelson et al. | |
| 6,750,685 B1 | 6/2004 | Guerrero Mercado | |
| 7,019,666 B2 | 3/2006 | Tootoonian Mashhad et al. | |
| 7,031,859 B2 | 4/2006 | Piesinger | |
| 7,085,145 B2 | 8/2006 | Sheehy et al. | |
| 7,157,810 B2 | 1/2007 | Kanouda et al. | |
| 7,199,527 B2 | 4/2007 | Holman | |
| 7,248,490 B2 | 7/2007 | Olsen et al. | |
| 7,262,694 B2 | 8/2007 | Olsen et al. | |
| 7,385,373 B2 | 6/2008 | Doruk et al. | |
| 7,456,519 B2 | 11/2008 | Takeda et al. | |
| 7,676,334 B2 | 3/2010 | Matsuura et al. | |
| 7,747,739 B2 | 6/2010 | Bridges et al. | |
| 7,752,145 B2 | 7/2010 | Kelty | |
| 7,804,183 B2 | 9/2010 | Arinaga | |
| 7,933,695 B2 | 4/2011 | Yamaguchi | |
| 8,053,921 B2 | 11/2011 | Ichikawa | |
| 8,125,183 B2 | 2/2012 | Katsunaga | |
| 8,149,114 B2 | 4/2012 | Hanft | |
| 8,183,995 B2 | 5/2012 | Wang et al. | |
| 8,193,662 B1 * | 6/2012 | Carlson | H02J 9/061 307/23 |
| 8,288,887 B2 * | 10/2012 | Ransom | H02M 3/33584 307/9.1 |
| 8,288,974 B2 | 10/2012 | Aoki et al. | |
| 8,644,037 B2 * | 2/2014 | Raju | H02M 5/458 363/37 |
| 9,718,374 B2 * | 8/2017 | Tang | B60L 11/1816 |
| 2002/0019758 A1 | 2/2002 | Scarpelli | |
| 2002/0305842 | 10/2002 | Hirai et al. | |
| 2002/0171436 A1 | 11/2002 | Russell | |
| 2002/0173902 A1 | 11/2002 | Haimerl et al. | |
| 2002/0190525 A1 | 12/2002 | Worden et al. | |
| 2003/0007369 A1 | 1/2003 | Gilbreth et al. | |
| 2003/0057919 A1 | 3/2003 | Yang | |
| 2003/0081433 A1 * | 5/2003 | Itakura | H02M 1/36 363/21.06 |
| 2004/0062059 A1 | 4/2004 | Cheng et al. | |
| 2004/0095263 A1 * | 5/2004 | Thomas | H02M 3/157 341/53 |
| 2004/0115487 A1 * | 6/2004 | Ichinose | H01M 8/04559 429/9 |
| 2004/0262996 A1 | 12/2004 | Olsen et al. | |
| 2004/0263116 A1 | 12/2004 | Doruk et al. | |
| 2005/0083715 A1 * | 4/2005 | Guillarme | H02M 1/32 363/65 |
| 2005/0180175 A1 | 8/2005 | Torrey et al. | |
| 2005/0276082 A1 * | 12/2005 | Panda | H02M 1/4216 363/70 |
| 2006/0023478 A1 | 2/2006 | Takeda et al. | |
| 2006/0141093 A1 | 6/2006 | Leu | |
| 2006/0171182 A1 * | 8/2006 | Siri | H02M 3/33592 363/131 |
| 2006/0338889 | 12/2006 | Kuranuki et al. | |
| 2007/0005195 A1 | 1/2007 | Pasquale et al. | |
| 2007/0103122 A1 * | 5/2007 | Morong | G05F 1/46 323/205 |
| 2007/0117436 A1 | 5/2007 | Davis | |
| 2007/0145952 A1 | 6/2007 | Arcena | |
| 2007/0200433 A1 | 8/2007 | Kelty | |
| 2008/0012667 A1 | 1/2008 | Colsch et al. | |
| 2008/0141918 A1 | 6/2008 | McClintock | |
| 2008/0178215 A1 | 7/2008 | Nishigaki | |
| 2008/0183408 A1 | 7/2008 | Matsuura et al. | |
| 2008/0272934 A1 | 11/2008 | Wang et al. | |
| 2009/0102424 A1 | 4/2009 | Tien et al. | |
| 2009/0146423 A1 | 6/2009 | Arinaga | |
| 2009/0160259 A1 | 6/2009 | Naiknaware et al. | |
| 2009/0284200 A1 * | 11/2009 | Iwahori | H02M 7/48 318/400.27 |
| 2009/0288896 A1 | 11/2009 | Ichikawa | |
| 2010/0034003 A1 | 2/2010 | Rozman et al. | |
| 2010/0054010 A1 * | 3/2010 | Darroman | B60L 1/00 363/131 |
| 2010/0082464 A1 | 4/2010 | Keefe | |
| 2010/0103703 A1 * | 4/2010 | Nishiyama | H02M 3/3376 363/17 |
| 2010/0114387 A1 | 5/2010 | Chassin | |
| 2010/0244775 A1 * | 9/2010 | Smith | H02M 3/33584 320/140 |
| 2010/0244788 A1 * | 9/2010 | Chen | H02M 3/1584 323/234 |
| 2010/0308584 A1 | 12/2010 | Coates et al. | |
| 2011/0221195 A1 | 9/2011 | Raju | |
| 2012/0069619 A1 | 3/2012 | Badger et al. | |
| 2012/0319748 A1 | 12/2012 | Luo | |
| 2013/0030588 A1 | 1/2013 | Smith et al. | |
| 2013/0057200 A1 * | 3/2013 | Potts | H02M 3/33584 320/107 |
| 2014/0132073 A1 * | 5/2014 | Satake | H02J 1/102 307/64 |
| 2015/0035359 A1 * | 2/2015 | Chung | H02J 3/32 307/23 |
| 2016/0149502 A1 * | 5/2016 | Kidera | H02M 3/33584 363/21.06 |

(56) References Cited

U.S. PATENT DOCUMENTS

FOREIGN PATENT DOCUMENTS

| EP | 2 475 059 A1 | 7/2012 |
|---|---|---|
| JP | 2002-305842 A | 10/2002 |
| JP | 2006-141093 A | 6/2006 |
| JP | 2006-338889 A | 12/2006 |
| JP | 2008-141918 A | 6/2008 |
| JP | 2008-178215 A | 7/2008 |
| TW | 200849770 A | 12/2008 |

OTHER PUBLICATIONS

Choe et al. "A Parallel Operation Algorithm with Power-Sharing Technique for FC Generation Systems". 2009.725-731.
International Search Report PCT/US2010/040258 dated Jan. 14, 2011.
International Search Report, PCT/US2010/040261 dated Feb. 8, 2011.
Chenier, Glen. Reversal of Fortune. Electronic, Design, Strategy, News. 2009. p. 62.
International Search Report, PCT/US2012/071709 dated Jun. 12, 2013.
International Search Report, PCT/US2012/071703 dated May 14, 2013.
Taiwan Office Action and International Search Report, Taiwan Patent Application No. 099121170, filed Jun. 28, 2010 (Jun. 28, 2010).
U.S. Appl. No. 10/710,234, filed Jun. 28, 2004.
U.S. Appl. No. 11/328,460, filed Jan. 10, 2006.
M.A. Kai, "Lessons Learned from the Texas Synchrophasor Network", IEEE-PES Innovative Smart Grid Technologies Conference, Berlin, Oct. 14-17, 2012.
Office Action dated May 23, 2014 for U.S. Appl. No. 12/731,070.

* cited by examiner

BIDIRECTIONAL ENERGY CONVERTER WITH CONTROLLABLE FILTER STAGE

CROSS-REFERENCE TO RELATED APPLICATIONS

This application is a divisional of co-pending U.S. patent application Ser. No. 12/731,070, filed Mar. 24, 2010, which claims the benefit of U.S. Provisional Application No. 61/163,214 filed Mar. 25, 2009. Both applications are hereby incorporated herein by reference.

BACKGROUND

Field

Traditional energy storage or conversion systems have utilized converters to transfer energy from DC to AC, or vice versa. For instance, an inverter may be utilized to convert energy from DC to AC, and a rectifier may be used to convert energy from AC to DC. Systems have been developed to both charge and discharge an energy storage system. Traditionally, separate inverter and rectifier circuits are utilized for each type of energy conversion. Various energy conversion configurations have been developed in order to allow such functions. See, e.g., U.S. Pat. No. 6,160,722, U.S. Patent Publication No. 2004/0062059, U.S. Pat. No. 6,587,362, U.S. Patent Publication No. 2003/0057919, and U.S. Pat. No. 6,750,685, which are hereby incorporated by reference in their entirety. Furthermore, traditional energy conversion systems used as battery chargers are unable to adapt to various energy storage technologies, such that single customized designs are required for a given battery technology.

A need exists for a bidirectional converter that enables bidirectional conversion between AC and DC within the same component or circuit. A further need exists for an AC to DC converter, which may be used to charge an energy storage device, capable of controlling the DC output to adapt to an energy storage technology.

SUMMARY OF THE INVENTION

The invention provides systems and methods for bidirectional energy conversion. Various aspects of the invention described herein may be applied to any of the particular applications set forth below or for any other types of circuits or devices. The invention may be applied as a standalone system or method, or as part of an integrated package, such as an energy storage charging or discharging system. It shall be understood that different aspects of the invention can be appreciated individually, collectively, or in combination with each other.

In accordance with an aspect of the invention, a bidirectional converter may be provided. The bidirectional converter may be formed such that it may function as a DC to AC energy converter and/or an AC to DC energy converter within the same device or component. For example, a circuit may be provided that may function for bidirectional energy conversion. Within the circuit, current may flow in opposite directions, depending on the mode of operation. Thus, the same bidirectional converter may be able to function as an inverter and as a rectifier.

A bidirectional converter can, under software control, reconfigure itself from an AC generation mode to a charge mode. In an AC generation mode, DC input power from an energy source such as a battery or capacitor may be converted to AC. For instance, the DC input power may be converted to 120 VAC, 50/60 Hz, single phase. In a charge mode, AC may be converted to DC. In one implementation, 120 VAC, 50/60 Hz may be converted to DC under a specified algorithm to recharge the DC power source.

The bidirectional converter may operate in series, parallel, or series/parallel combinations with other bidirectional converters as a part of an energy storage unit (ESU). The ESU may supply 240 VAC, 50/60 Hz, single phase, 208 VAC, 50/60 Hz, 3 phase Wye or 480 VAC, 3 phase Wye or Delta connected AC power at various power levels determined by the ESU configuration and number of bidirectional converters. The operation of the converters in series may be advantageous in enabling a unit operating at 120 VAC to 138 VAC as a building block for another voltage output, such as 240 VAC, 208 VAC or 277 VAC up to 480 VAC. Traditional inverters operate at either 120 or 240 VAC and can operate in parallel, but not as a building block to higher voltages.

The output voltage and current of the bidirectional converter may be controlled very precisely so as to enable precise delivery of power and energy to the desired load or when interconnected to an electric grid to deliver a precise amount of power and energy to the grid. For example this would allow the bidirectional converter to deliver a precise number of watts of power against a given load or a precise amount of energy on command.

The response time of the bidirectional converter to change from the charge mode to the AC generation mode may be less than one cycle at 60 Hz (16 ms). However, the actual time of mode change may vary, and may depend on the time it takes to detect the circumstances that can trigger the change (loss of AC, etc.). The invention may advantageously provide a design that can convert from being an inverter to being a battery charger. The bidirectional converter may change modes 'on the fly.' The bidirectional converter may also have a programmable battery charger algorithm in charge mode as well as a smooth transition to AC generation mode (including a constant voltage mode). This can be especially useful in energy recapture applications such as automobile regenerative braking, elevator energy recapture, standby power, etc. This may reduce or eliminate duplicative charge vs. power systems and the attendant harmonic and resonance problems that can arise from feedback loops attendant to traditional two part designs.

In the AC generation mode, the bidirectional converter can be programmed to monitor the AC line and provide power under specified overload or 'spike in usage' conditions.

The bidirectional converter design may be efficient and reliable. Fault monitoring and reporting software may be part of the control system. Such monitoring and control may provide a sophisticated design for a single converter module in use with others. The bidirectional converter can also be commanded to turn off or isolate from a group of converters. The converter may perform some form of self-check, which may be adopted in the software and hardware control.

Another feature that can be implemented into the system may be to shift the frequencies (e.g., 100 KHz and 30 KHz) slightly on a constant basis in co-ordination with the other bidirectional converters in the system to minimize or reduce electromagnetic interference (EMI) emissions. A control system may be coordinating and communicating with the bidirectional converters to operate at desirable frequencies with respect to one another.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE FIGURES

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
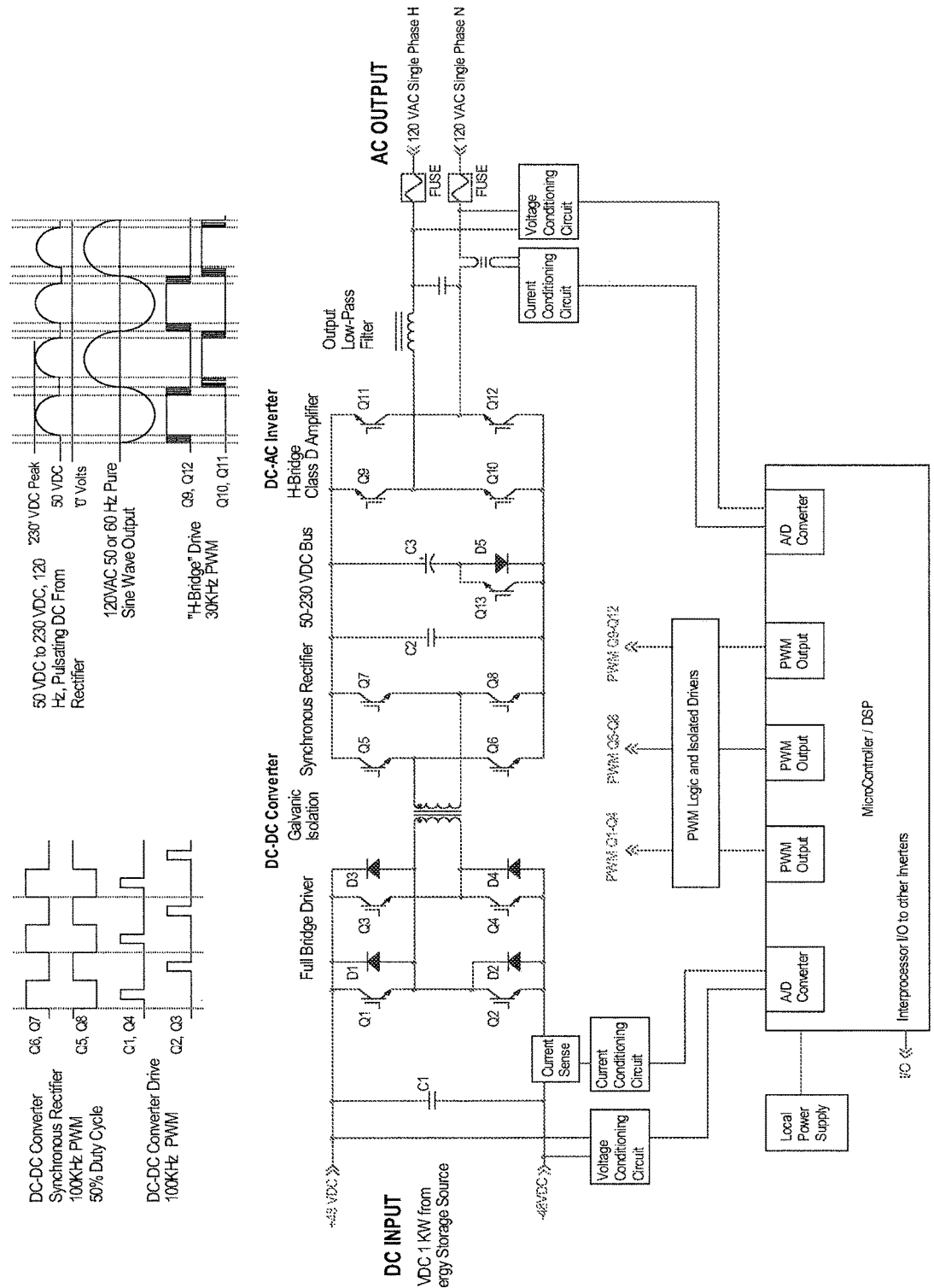
FIG. 1 shows a functional block diagram for an AC generation mode.

While preferred embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides a bidirectional converter, that may operate in an AC generation mode, where the bidirectional converter may function as an inverter to convert DC to AC. The bidirectional converter may also operate in a charge mode, where the bidirectional converter may function as a rectifier to convert AC to DC. The bidirectional converter may be able to operate in both modes within the same device or component, rather than utilizing two separate circuits or components for each mode. A single circuit may be utilized to form the bidirectional converter. For different modes, the same circuit with the same paths may be operating in forward or reverse. In an AC generation mode, a circuit may be provided with a path to convert DC to AC. In a charge mode, the same circuit may be provided with the same path to convert AC to DC. In some instances, current may flow in different (and/or opposing) directions along the same circuit for a DC to AC mode and an AC to DC mode.

A bidirectional converter may comprise at least one DC terminal and at least one AC terminal. A DC terminal may function as a DC input when the converter is in AC generation mode, and may function as a DC output when the converter is in charge mode. An AC terminal may function as an AC output when the converter is in AC generation mode, and may function as an AC input when the converter is in charge mode.

The bidirectional converter may include a DC-DC conversion stage disposed between the DC terminal and the AC terminal. The converter may also include a bridge conversion stage disposed between the DC-DC conversion stage and the AC terminal, wherein the bridge conversion stage is selectively operable to invert a current when the current is flowing from the DC terminal to the AC terminal, and to rectify the current when the current is flowing from the AC terminal to the DC terminal. Thus, a bidirectional converter may include at least two stages in either mode. In an AC generation mode, the bidirectional converter may include a DC-DC conversion stage and a DC-AC conversion stage. In a charge mode, the bidirectional converter may include an AC-DC conversion stage and a DC-DC conversion stage. Optionally, additional stages may be provided in either mode. In some embodiments, one or more transformer may be utilized in the DC-DC conversion stage, and one or more bridge may be used in the bridge conversion stage.

I. AC Generation Mode

In an AC generation mode of operation, a bidirectional converter may operate as an inverter. Thus, a bidirectional converter may operate in a forward direction, by receiving DC as input and providing AC as output. In one implementation, the inverter may be taking 48 VDC as input and delivering 120 VAC, 50 or 60 Hz, single phase output. Alternatively, the inverter may be configured to take any value DC as input, such as about 6 VDC, 12 VDC, 24 VDC, 48 VDC, 72 VDC, 100 VDC, 200 VDC, or 500 VDC. The inverter may also be configured to provide any sort of AC output. For example, the output may have any value VAC, such as about 10 VAC, 20 VAC, 50 VAC, 120 VAC, 200 VAC, or 500 VAC; or any Hz output, such as 20 Hz, 50 Hz, 60 Hz, 100 Hz, 200 Hz, 400 Hz.

FIG. 1 shows a functional flow of the bidirectional converter in the AC generation mode. A DC input may be provided, as well as an AC output. The bidirectional converter may include a DC-DC converter stage, DC-DC synchronous rectifier stage, and a DC-AC inverter stage.

The bidirectional converter may also include a single or a plurality of digital signal processors (DSP). A single DSP, or alternatively two DSPs, may be used to control the input and output functions on the respective sides of an electrically isolated data path. In some instances, using two or more DSPs may be advantageous over using one DSP, since much logic would have to be electrically isolated for one DSP to do all the work. The use of two or more DSPs may also be advantageous considering the low cost of DSPs and the high cost of isolation hardware. Furthermore, doing everything in hardware may be unnecessarily complicated, and may take a long time to debug and may be prone to iteration errors that can also consume development time. However, in alternate embodiments, one DSP may be utilized. For example, a single DSP may provide a plurality of pulse width modulated (PWM) outputs. In one example, the plurality of PWM outputs may include an output to Q1-Q4, Q5-Q8, Q9-Q12, and/or Q13.

In some embodiments, the DSPs may be a microcontroller or microprocessor. An isolated data path may be provided between two or more DSPs. A plurality of DSPs utilized by the same converter may communicate with one another via a data path. One or more of the DSPs may be configured to communicate with one or more other energy converters. For instance, a DSP may include an input/output interface that may be an interprocessor input/output to other converters. Any communication between DSPs or converters may occur through a wire or wirelessly.

A. DC-DC Converter Driver

Figure 2:
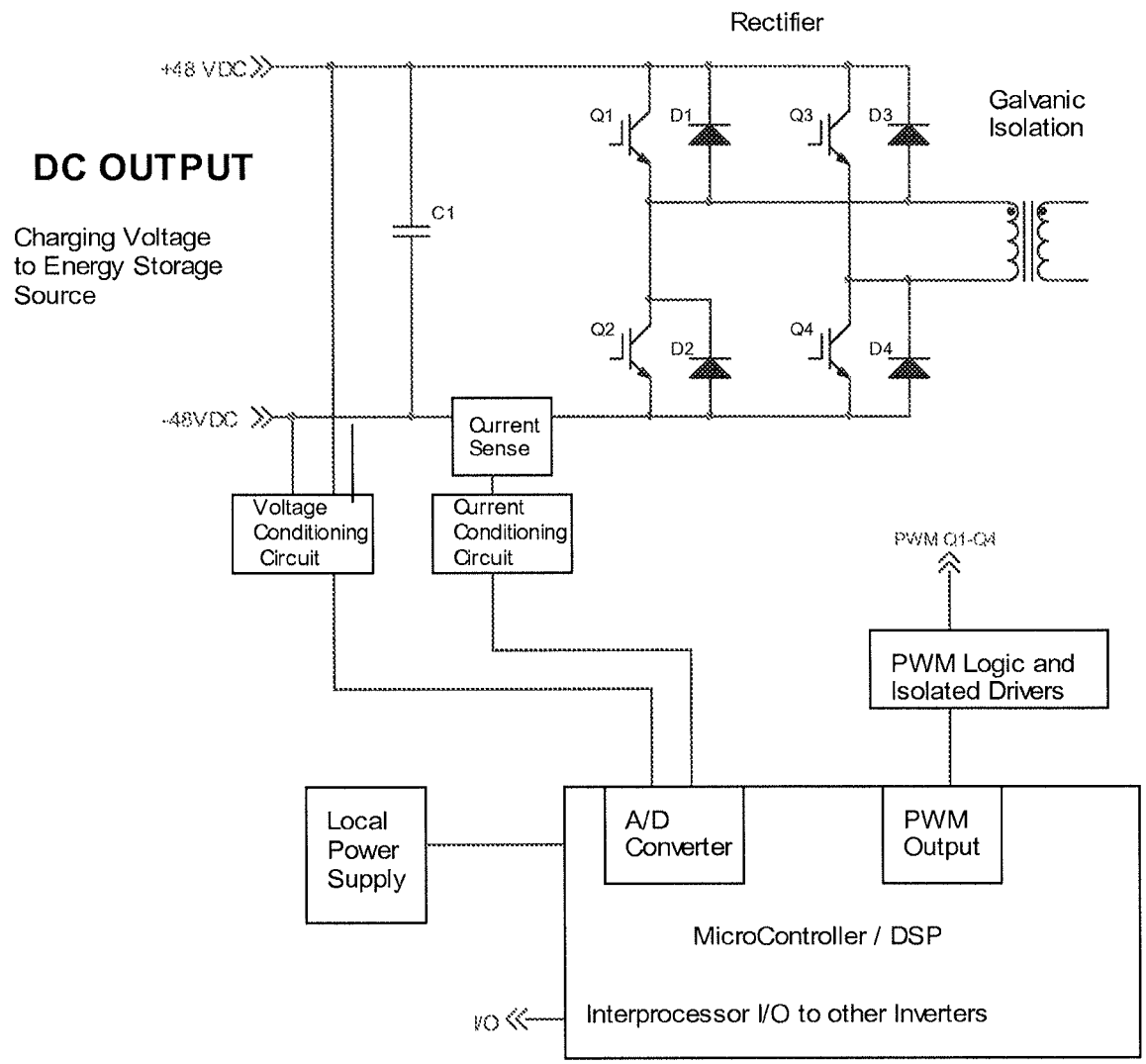
FIG. 2 shows a DC-DC converter driver stage.

FIG. 2 shows a DC-DC converter driver stage. A DC input may be conveyed to the DC converter stage. In FIG. 2, a 48 VDC input voltage is fed into the DC to DC converter stage comprising Q1 thru Q4 driving the isolation transformer. Q1 thru Q4 are shown as IGBT's, but could be transistors or power MOSFET's. Q1 thru Q4 may form a full bridge driver, and may pulse width modulated up to a 49% duty cycle for maximum or increased efficiency. The frequency of operation may be 100 KHz. Positive feedback controls the regulation at this stage.

A local power supply may also be provided. The local power may optionally provide isolated outputs to a DSP and/or signal from the DC input.

In DC to AC (Inverter) mode a filter may be provided. The filter (represented by C1 in FIG. 2) may isolate any noise and electrical transients generated in the DC to DC converter from being reflected back into the battery bus circuit. In AC to DC (Charge) mode the filter may eliminate high frequency noise in the output of the DC to DC converter, preventing this noise from being conducted into the battery bus circuit.

Input voltage and/or current may be monitored and the data may be stored in a DSP (e.g., DSP 1) to determine power used from the source. The DSP may include an analog-digital (A/D) converter, which may receive the data. This data may be required for some battery charging algorithms, while it may be optional in others. Such data may be helpful because the bidirectional converter may also function as a battery charger. In some battery charging algorithms it may be desirable to know how much charge has been removed from the battery.

The DSP may provide a pulse width modulation (PWM) output. The output may be directed thru the PWM logic and isolated drivers to Q1-Q4, providing a drive waveform. The DSP may or may not consider the input voltage and/or current in providing PWM output.

Figure 3:
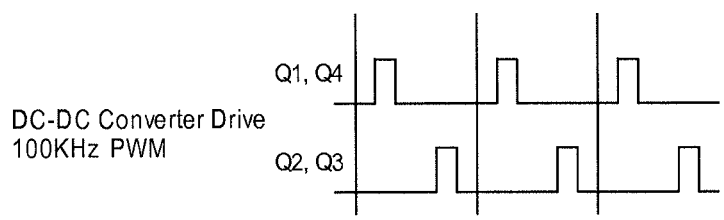
FIG. 3 shows an example of a drive waveform for Q1-Q4.

FIG. 3 shows an example of a drive waveform for Q1-Q4 in this configuration. In one implementation, the drive waveform may be 100 KHz with a pulse width modulated up to a 49% duty cycle. However, other drive waveforms may be provided, which may have varying degrees of frequency (e.g., the waveform may have any Hz value, such as 1 KHz, 50 KHz, 200 KHz, 500 KHz, or 1 MHz) or a different duty cycle, (e.g., the waveform may have any value percent for the duty cycle, such as 10% duty cycle, 20% duty cycle, 30% duty cycle, 45% duty cycle).

Galvanic isolation may be provided. In one embodiment, galvanic isolation may be provided by a transformer.

Figure 4:
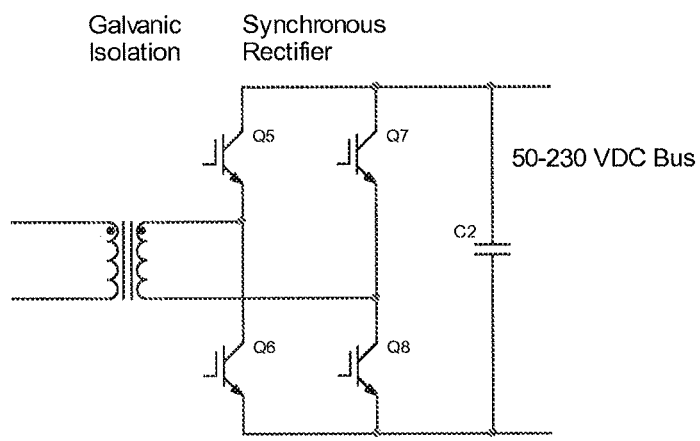
FIG. 4 shows a DC-DC converter synchronous rectifier stage.
Figure 4:
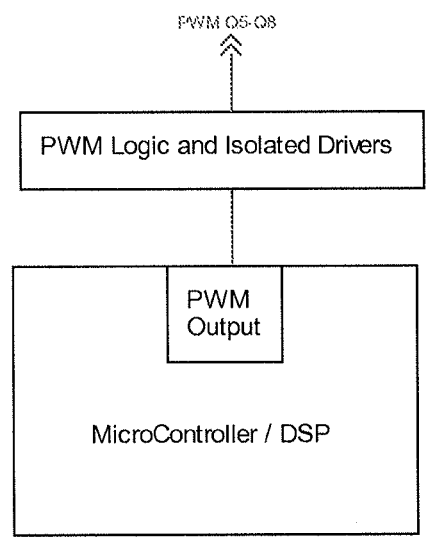

B. DC-DC Converter Synchronous Rectifier Stage:

FIG. 4 shows a DC-DC converter synchronous rectifier stage. The synchronous rectifier stage may include Q5-Q8, which may receive a PWM output from the DSP or a second DSP. In some embodiments, Q5-Q8 may be IGBT's, transistors, or power MOSFET's. The pulses to Q5-Q8 may control the voltage on a bus across a capacitor. The voltage from the bus may be inputted to the DSP, through the A/D converter of the DSP. Such data may or may not be utilized by the DSP to control the PWM output at this stage or another stage.

In FIG. 4, Q5-Q8 may form a synchronous rectifier that operates at a given frequency. In some embodiments, the operation frequency for Q5-Q8 may be synchronized with the frequency for Q1-Q4. For example, if Q1-Q4 operate at 100 KHz, Q5-Q8 may also operate at 100 KHz. Furthermore, Q5-Q8 may be pulse width modulated to control the DC voltage on a "50-230 VDC Bus" across capacitor C2.

For instance, the 50-230 VDC bus may be actually driven to form a pulsating DC half sine wave. In one implementation, the produced wave may be a 120 Hz pulsating DC half sine wave that may be about 50 volts above the 60 Hz sine wave that will be output (e.g., by the "H" bridge class D amplifier) in a later stage. This may allow a two stage approach to smoothing the AC sine wave. This may also save power in Q5-Q8 because they don't have to keep a 230 volt charge on C2 and may also save power (e.g., on an "H" bridge) in the later stage because it now can use broader PWM pulses of lower amplitude. This approach may be more efficient, resulting in lower power dissipation with less heat generated. This approach results in the "H" bridge output amplifier switching only at 50 VDC or below, above 50 VDC the sine wave is created by the DC-DC converter output at 100 KHz. C2 provides an additional stage of low pass filtering when operating in this mode. Q9-Q12 ("H" bridge class D amplifier) will not be pulse width modulated when the DC bus is above 50 VDC but will remain in a condition to provide the proper phase for the DC-DC converter output. This technique may be referred to as a "Smith Two Stage Converter".

A process within the DSP or on a second DSP, (e.g., DSP 2), may maintain synchronization with the AC line frequency and this may be used to both regulate and synchronize the 120 Hz pulsating DC and to regulate and synchronize the output from the "H" Bridge amplifier. In a preferable embodiment of the invention, both of these functions may be provided in one DSP on the "hot" side or "cold" side. However, in alternate embodiments, separate DSPs may be utilized for each function, or one or more of these functions may be combined with the first DSP.

Figure 5:
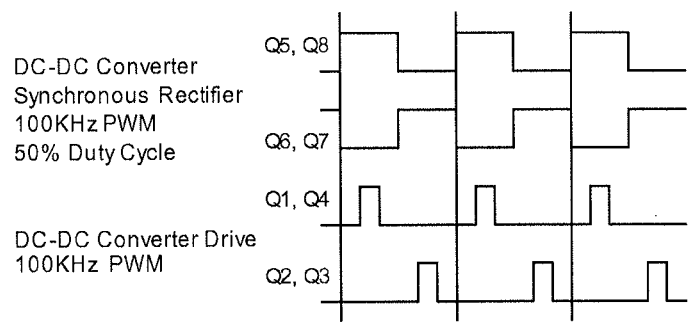
FIG. 5 shows an example of a timing relationship between drivers Q1-Q4 and synchronous rectifiers Q5-Q8.

FIG. 5 shows an example of a timing relationship between drivers Q1-Q4 and rectifiers Q5-Q8. As discussed previously, the frequency of the pulses for Q5-Q8 may be synchronized with Q1-Q4. If the frequency used for Q1-Q4 is varied, the frequency for Q5-Q8 may be adjusted accordingly to match the frequency for Q1-Q4. In FIG. 5 the pulse widths of Q1-Q4 may be controlled to produce a desired output. In one example, the desired output may be a 120 Hz output that is 50 VDC above and tracking with the output AC waveform (also see FIG. 7). However, if the desired output is varied, the duty cycles of Q5 and Q6 may be varied accordingly. In some implementations, the duty cycles for Q5 and Q6 may be lower than the duty cycles for Q7 and Q8. The pulse widths and frequencies of Q5 and Q6 may be controlled by either the main DSP or DSP 2.

This technique may advantageously provide a half wave pulsating DC output. In some embodiments, the output may be a 120 Hz half wave pulsating DC, which may be used to feed an "H" bridge output. A half wave DC output may be advantageous over using a feed line that was at 230 VDC (or some other desirable voltage) all of the time. If the feed line were at 230 VDC all the time, large narrow spikes may result in the "H" bridge output, and have to be suppressed by a low pass output filter. By contrast, the synchronous rectifiers Q5-Q8 may have less load because they can operate at a specified frequency (such as 100 KHz) and may not be required to hold up the 230 VDC bus at the maximum level. The output of Q5-Q8 may be smoothed by a capacitor C2. This has the benefit of reducing duty cycle and increasing efficiency.

C. DC-AC Inverter

Figure 6:
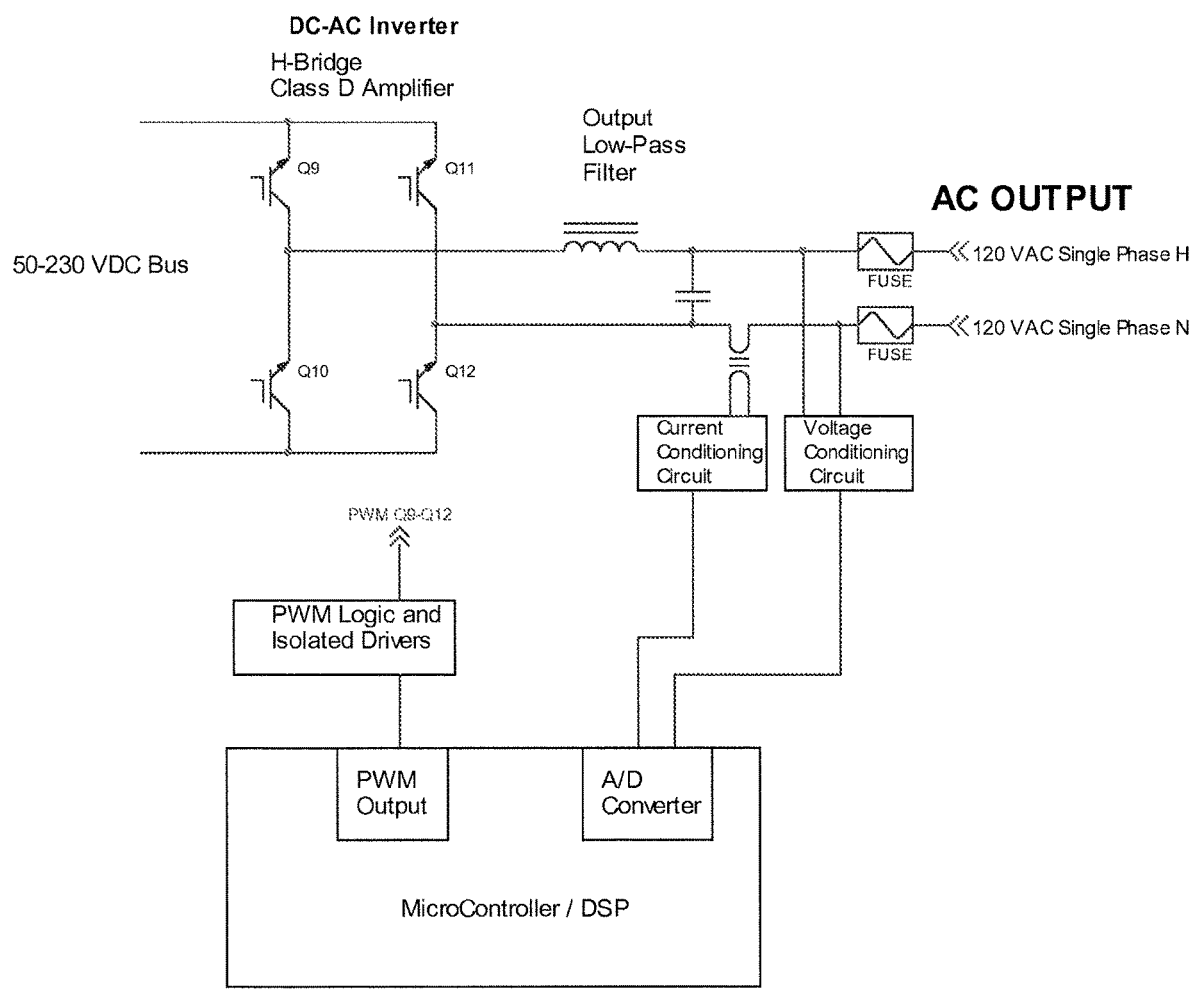
FIG. 6 shows an "H" bridge AC output stage.

FIG. 6 shows an "H" bridge AC output stage. The "H" bridge may receive a DC from a prior stage. Preferably, the DC received may be a half wave pulsating DC. The "H" bridge may also include Q9-Q11, which may receive PWM outputs from a DSP. The DSP may control the drive signals provided to the "H" bridge. From this, the "H" bridge may provide an AC output. In some embodiments, Q9-Q11 may be IGBT's, transistors, or power MOSFET's.

The "H" bridge output stage may operate as a class "D" amplifier. In one implementation, the bridge may operate as an amplifier with a PWM frequency of 30 KHz to produce a 50 or 60 Hz sine wave. Depending on the desired output, a bridge may provide a PWM frequency to produce a desired frequency output. The output may be passed through a low pass filter to filter out all the PWM (e.g., 30 KHz and 100 KHz) switching noise and pulses leaving only the pure sine wave.

The input voltage to the "H" bridge may be synchronized by the rectifier. In a preferable embodiment of the invention, the input voltage to the "H" bridge may always be around 30 volts higher than the required output. In another embodiment, the input voltage may always be some specified number of volts higher than the required output (e.g., which may be any value, such as about 1 volt, 5 volts, 10 volts, 20 volts, 25 volts, 35 volts, 40 volts, 50 volts, 100 volts). This margin may provide enough voltage to deliver any surge requirements. Any margin of volts may be used, which may be sufficient to deliver surge requirements, depending on expected surge magnitude, or other characteristics of the system.

The AC output from the "H" bridge may be provided to one or more fuse. In one example, a first fuse may be provided with 120 VAC single phase H, and another may be provided with 120 VAC single phase N. In some embodiments, a current conditioning circuit and/or a voltage conditioning circuit may be provided, which may affect the AC output provided to the fuses.

Figure 7:
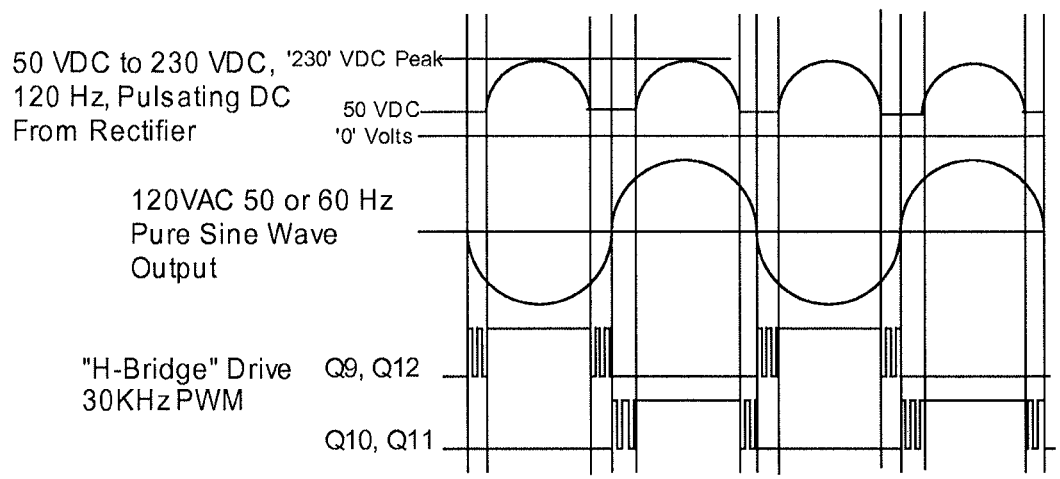
FIG. 7 shows an example of timing relationships for an "H" Bridge output stage.

FIG. 7 shows the timing relationships of the drive signals, the pulsating DC, and the output waveform of the "H" bridge class "D" amplifier.

The drive signals, the Q9-Q12 may be pulse width modulated as shown in FIG. 7. In one implementation, Q9-Q12 may be pulse width modulated at a 30 KHz rate. In other implementations, Q9-Q12 may be modulated at another rate, depending on the desired characteristics of the output voltage. The "H" bridge is PW modulated at 30 KHz only when the DC bus voltage is at 50 VDC or below. When the DC bus is above 50 VDC the "H" bridge operates at 60 Hz to provide the proper phase for the DC-DC converter output.

The pulsating DC may be provided as a half sine wave, as discussed previously. The pulsating DC may also be provided to the "H" bridge.

Furthermore, the output from the "H" bridge may pass through a low pass filter, to result in a pure or substantially pure sine wave output.

II. Charge Mode

In a charge mode of operation, a bidirectional converter may operate as a rectifier. Thus, a bidirectional converter may operate in a reverse direction, by taking AC as input and providing DC as output. The bidirectional converter may be receiving the AC input from a utility power line or grid, and may be delivering DC output to a battery, capacitor, ultracapacitor, or any other energy storage system. Thus, the bidirectional converter may be functioning as a charger. Alternatively, the bidirectional converter may be providing DC to any DC-receiving device.

In one implementation, the charger may be taking 120 VAC, 50 or 60 Hz, single phase input and delivering a controlled charge DC voltage. Preferably, the charge voltage being delivered may be controlled by a software algorithm. In one embodiment, the DC output may be 48 VDC. Alternatively, the charger may be configured to provide any voltage value DC as output, such as about 6 VDC, 12 VDC, 48 VDC, 72 VDC, 100 VDC, 200 VDC, or 500 VDC. The charger may also be configured to receive any sort of AC input. For example, the input may have any value VAC, such as about 10 VAC, 20 VAC, 50 VAC, 120 VAC, 138 VAC, 208 VAC, 240 VAC, or 500 VAC; or any Hz input, such as 10 Hz, 20 Hz, 80 Hz, 100 Hz, 200 Hz, 1 KHz, 50 KHz, 400 Hz, 100 KHz, or 1 MHz.

The bidirectional converter may be able to smoothly convert to a battery charger in a short amount of time. For instance, the inverter may be able to convert to a charger within milliseconds or microseconds.

Figure 8:
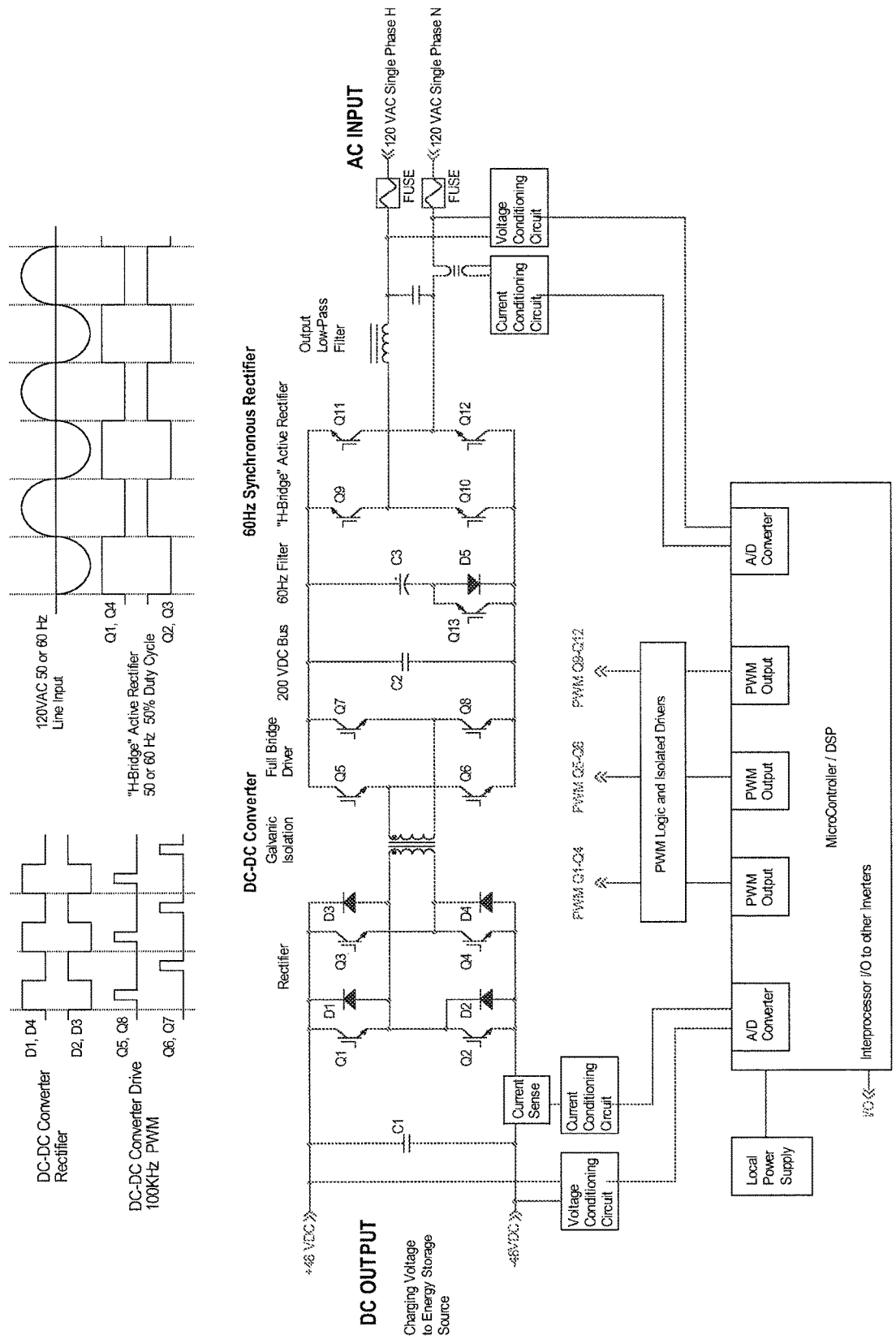
FIG. 8 shows a functional block diagram for a charge mode.

FIG. 8 shows a functional block diagram for a charge mode. An AC input may be provided, as well as a DC output. The bidirectional converter may include an AC-DC rectifier stage, a DC-DC converter stage, and a DC output stage.

A. AC-DC Rectifier

Figure 9:
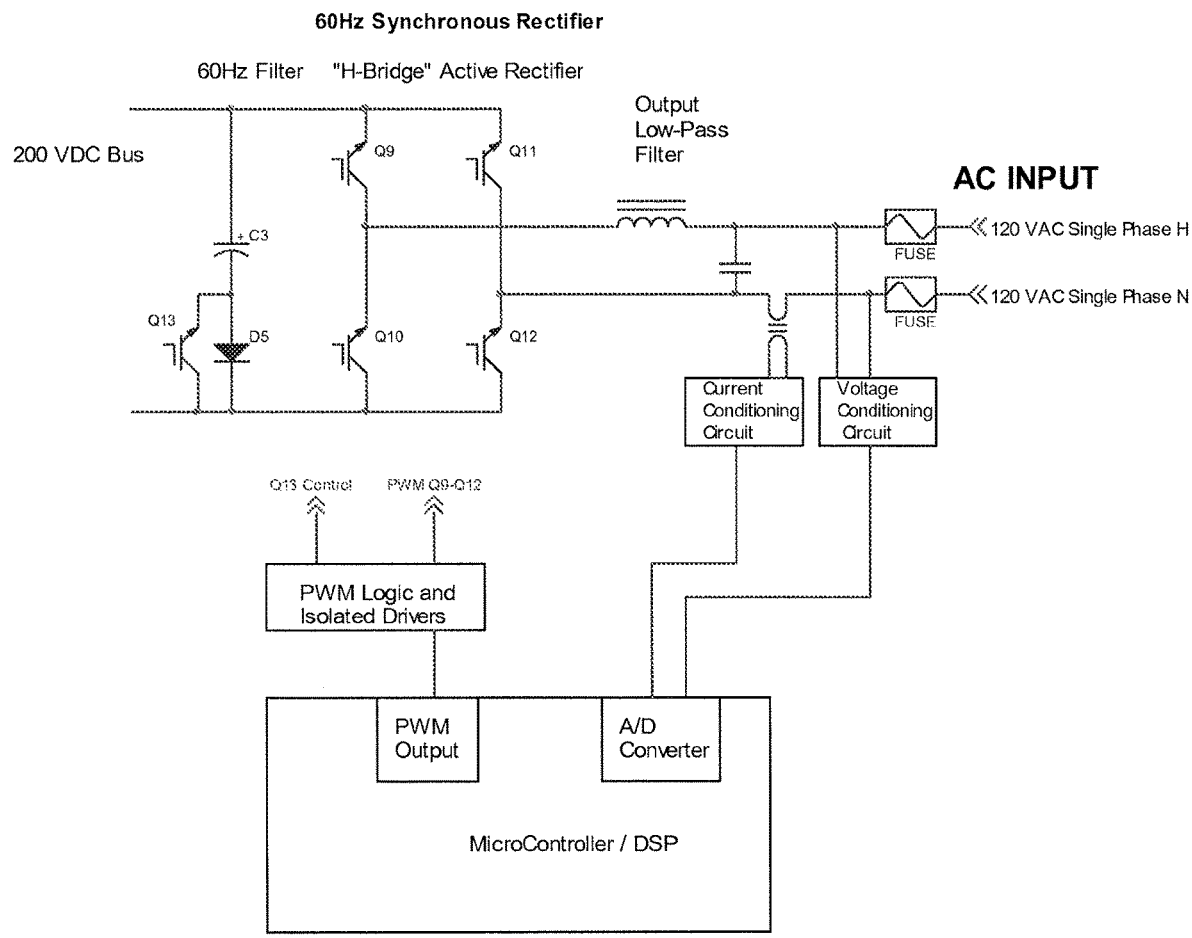
FIG. 9 shows an example of where Q9-Q11 may reverse roles and serve as a bridge rectifier.

FIG. 9 shows an example of where Q9-Q12 may reverse roles and serve as a synchronous bridge rectifier. The AC-DC rectifier stage may include an "H" bridge. The "H"

bridge may be a rectifier operating at a specified frequency. The specified frequency may be under software control. In one implementation, the software control may specify that the amplifier is operating at 60 Hz. In other embodiments, the software may specify another frequency.

Furthermore, under software control, the "H" bridge may be turned into a full wave bridge rectifier at 60 Hz (or some other specified frequency) by taking the AC line voltage, rectifying it, and applying the voltage to a capacitor C3. In some implementations, the AC line voltage may be a 120 VAC, 60 Hz line voltage. The "H" bridge may be a full wave bridge rectifier at the frequency of the AC line voltage. In other embodiments, depending on the AC source, other line voltage characteristics may be provided. The capacitor C3 may be enabled for the charge mode. In some instances, C3 is not enabled for the AC generation mode. The capacitor may be enabled in the charge mode by IGBT Q13. It should be noted that in this unique implementation the addition of C3 & Q13 enables the bidirectional operation of the bidirectional inverter by simultaneously filtering the DC bus and supporting the 200 VDC rail in charge mode while be able to be removed from the circuit via Q13 in the AC generation mode. We refer to this as the "Smith controllable filter."

In accordance with another aspect of the invention, the bidirectional converter can implement power factor correction of the power used in the battery charger mode. Such power factor correction may be realized because the system can also monitor the voltage and phase of the input voltage and current, may have sufficient processing power in the DSP, and may have full PWM software control over the rectifier configuration.

In this circuit, Q9-Q12 may serve as bridge rectifiers and a large electrolytic capacitor, C3, may be switched into the circuit by Q13 under software control when currents are at a minimum to reduce current spikes. Q9-Q12 and Q13 may receive PWM outputs from one or more DSP, such as DSP 2. DSP 2 may thus control the "H" bridge DC output.

In some embodiments, one or more AC inputs may be protected by one or more fuse. For example, a first fuse may provide a 120 VAC single phase H input and a second fuse may provide a 120 VAC single phase N input. A current conditioning circuit and/or a voltage conditioning circuit may be in electrical communication and may modify the AC input.

Figure 10:
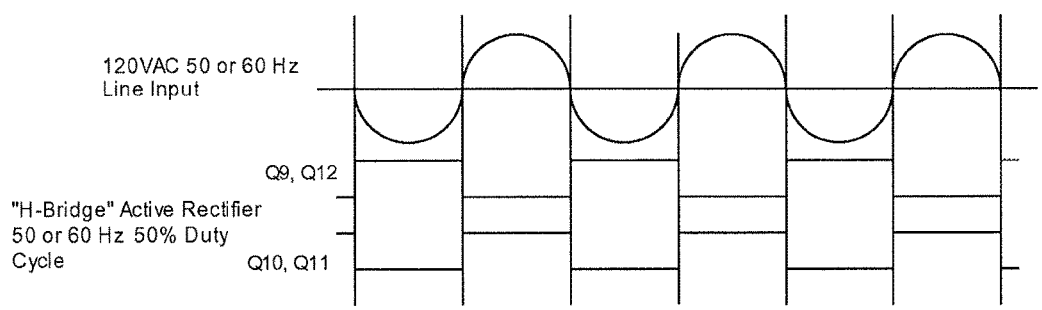
FIG. 10 shows an example of rectifier timing.

FIG. 10 shows an example of rectifier timing. An AC line input may be provided as a sine wave. For example, the line input may be a 120 VAC, 50 or 60 Hz sine wave. The rectifier pulses may be provided as shown. Q9-Q12 may be synchronized with the line input to match frequency. For example, if the AC line input is at 50 or 60 Hz, Q9-Q12 may also correspondingly be at 50 or 60 Hz. In a preferable embodiment, Q9-Q12 may also be at a 50% duty cycle. In other embodiments, Q9-Q12 may have other duty cycle values. Preferably, the waveform for Q9-Q12 may be the inverted waveform of Q10 and Q11, so while Q9 and Q12 output is on, Q10 and Q11 output is off, and vice versa.

B. DC-DC Converter

Figure 11:
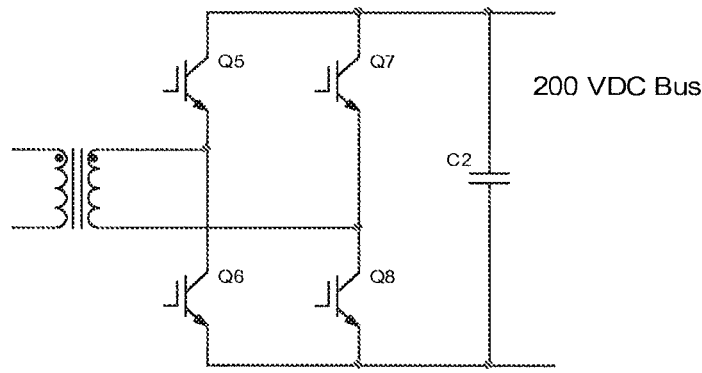
FIG. 11 shows a DC to DC converter driver stage.

FIG. 11 shows a DC to DC converter driver stage. As shown in FIG. 11, Q5-Q8 may now serve as the drivers for the DC to DC converter in the reverse direction provided by the charge mode. Q5-Q8 may operate at a desired frequency and duty cycle. In one implementation, Q5-Q8 may operate at 100 KHz with up to a 49% duty cycle providing full power to the output section, on the battery side.

Q5-Q8 may be controlled by the PWM output provided by a DSP. The same DSP, or another DSP, may also provide a PWM output to control Q13. Q13 may determine whether a capacitor C3 is on as part of the system or not. In some embodiments, Q13 may keep capacitor C3 on at all times in the charge mode.

The same DSP, or another DSP, may also receive a signal from the transformer through the A/D converter. The signal may or may not affect the PWM outputs provided by the DSP or related DSP.

Figure 12:
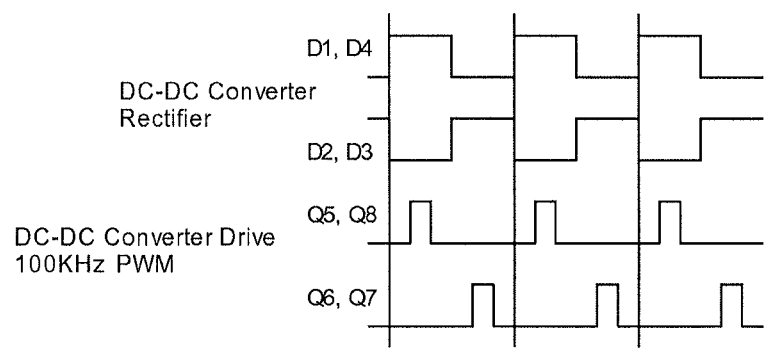
FIG. 12 shows an example of a timing relationship for Q5, Q6, Q7, and Q8.
Figure 13:
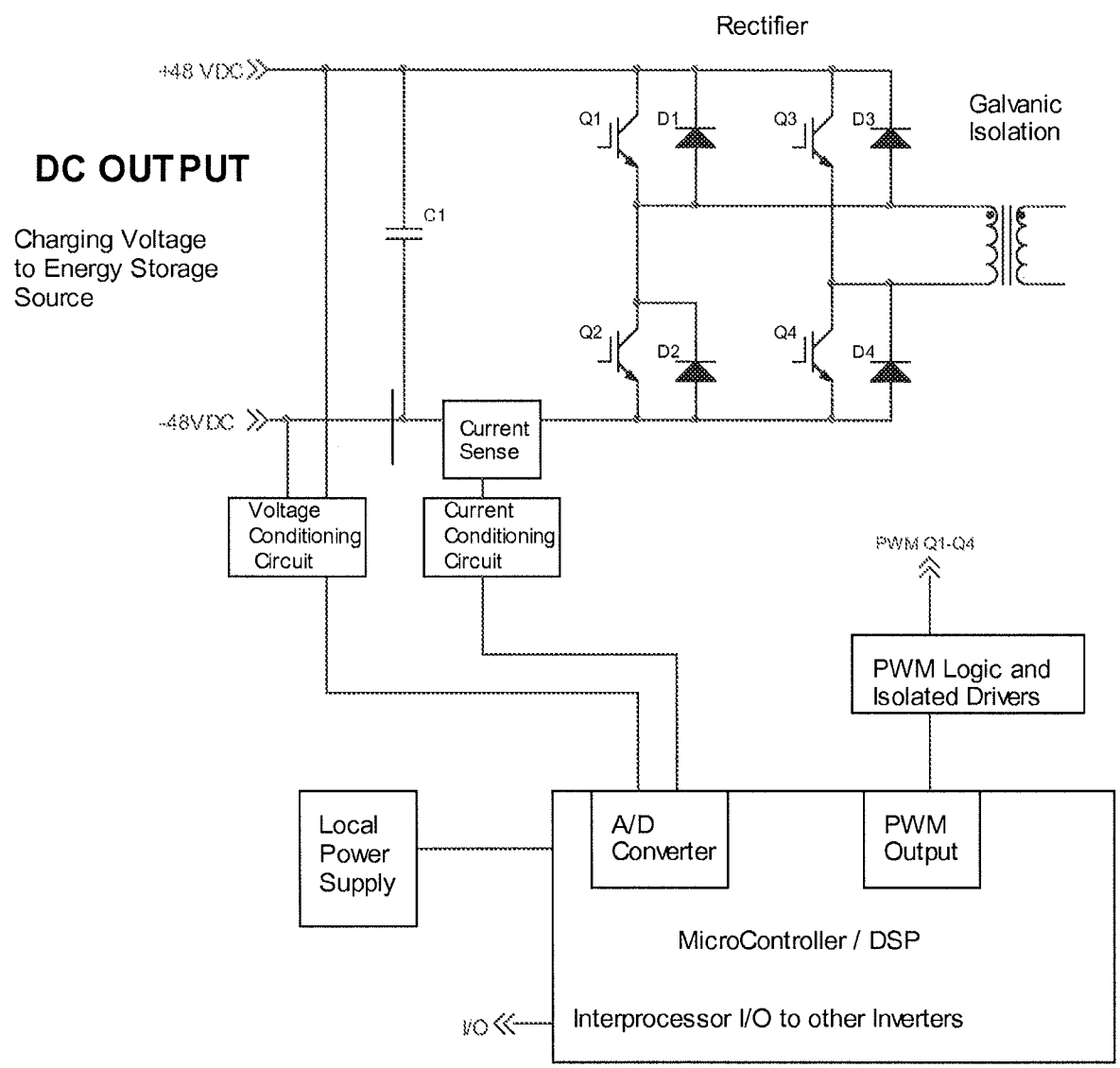
FIG. 13 shows a DC output stage to a battery.

FIG. 12 shows an example of a timing relationship for Q5-Q8 and D1-D4. Q5-Q8 may receive pulse width modulation from a DSP (e.g., DSP 2), and as shown in FIG. 13, D1-D4 act as rectifiers. The duty cycles of Q5-Q8 may be software controlled to provide the desired DC output.

C. DC Output Stage

FIG. 13 shows a DC output stage to a battery. Rectifiers D1-D4 provide the correct voltage and current to a battery, capacitor, ultra-capacitor, energy storage system, or DC-current receiver.

The current sense is DC and can sense current flowing into or out of the battery. The current sense may provide such information about sensed current to the DSP through an A/D converter. The DSP may utilize this information in providing the PWM output to Q5-Q8. Thus, feedback from DC-DC converter may be a desirable output. This may be advantageous over traditional systems, which had problems from using synchronous rectifiers in DC-DC converters that were in parallel with each other. See, e.g., Chenier, Glen, "Reversal of Fortune," Electronics Design, Strategy, News, Feb. 19, 2009, available at http://www.edn.com/article/CA6636525.html, which is hereby incorporated by reference in its entirety.

A filter may be provided in accordance with an embodiment of the invention. In a charge mode, the filter eliminates high frequency noise in the output of the DC to DC converter, preventing this noise from being conducted into the battery bus circuit.

The software charging algorithm may receive the information provided by the current sense, and provide a PWM output. The control algorithm may reside on the DSP, or may reside elsewhere on a system that may communicate with the DSP. For example, the software algorithm may reside on a computer or other processor and communicate with and/or control the DSP. If the software resides on a device external to the DSP, it may communicate with the DSP through a wire or wirelessly. The software algorithm may be implemented in computer readable media, which may contain instructions, logic, data, or code that may be stored in persistent or temporary memory of a device, such as a DSP, or may somehow affect or initiate action by the DSP.

By controlling the PWM output of the DSP, the software control determines the waveform provided to Q5-Q8, which in turn determines the DC output.

The algorithm monitors the voltage and current to the battery over time and temperature. Many charging scenarios include controlling the voltage and current over time and monitoring the temperature of the battery. This temperature information may be supplied by a separate battery status and temperature monitor that is part of the 'battery pack' or energy storage unit under charge. The same may apply to an ultra-capacitor, or other energy storage system.

The software charging algorithm may have full control over the entire nature of the DC output so it can be adapted to any energy storage technology. This may be advantageous over traditional designs that may require a single customized design specific to a given battery technology. Thus, the same physical circuit can be used to charge batteries with different characteristics.

For a charge mode, additional windings may be present on the isolation transformer, as compared to an AC generation mode. Additional rectifiers may be used in this mode. Such features may be provided because the DC available to the DC-DC converter may have a lower voltage than the DC at the bus (e.g., only 120 VDC and not 230 VDC). Thus, when going in the reverse direction (charge mode), it may be preferable to boost the voltage into the synchronous rectifiers.

III. Additional Embodiments

FIGS. 14-26 illustrate additional embodiments of the invention. Components, features, characteristics, steps, or any aspects described may be used in combination with any other embodiments, and are provided as a non-limiting example. Furthermore, components, features, characteristics, steps, or any aspects for any of the previously described embodiments may be applied to any of the embodiments herein.

A. AC Generation Mode

Figure 14:
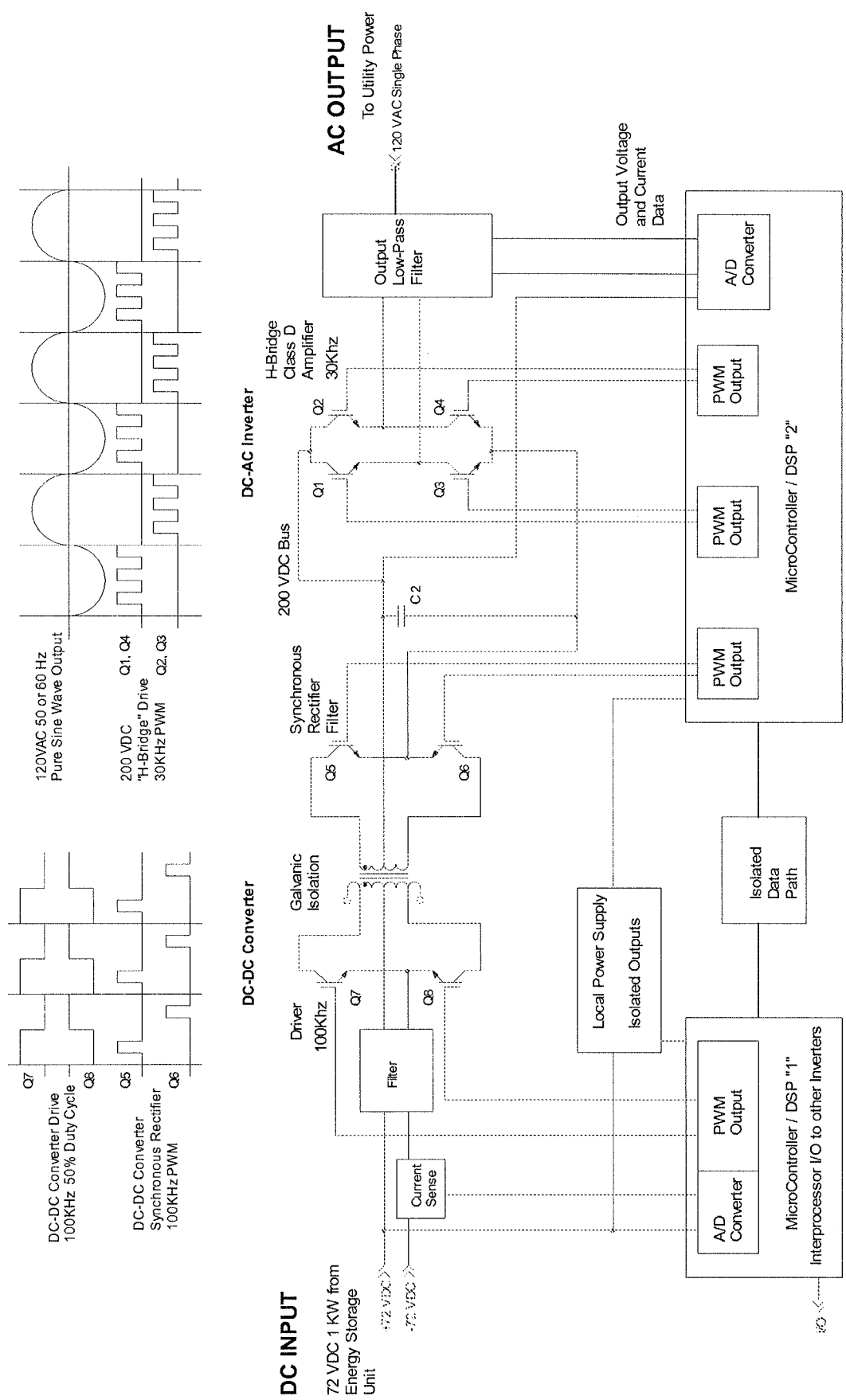
FIG. 14 shows a functional block diagram for an AC generation mode, in accordance with another embodiment of the invention.

FIG. 14 shows a functional block diagram for an AC generation mode. A DC input may be provided with an AC output. The converter may also include a DC-DC converter stage, DC-DC synchronous rectifier stage, and a DC-AC inverter stage.

Figure 15:
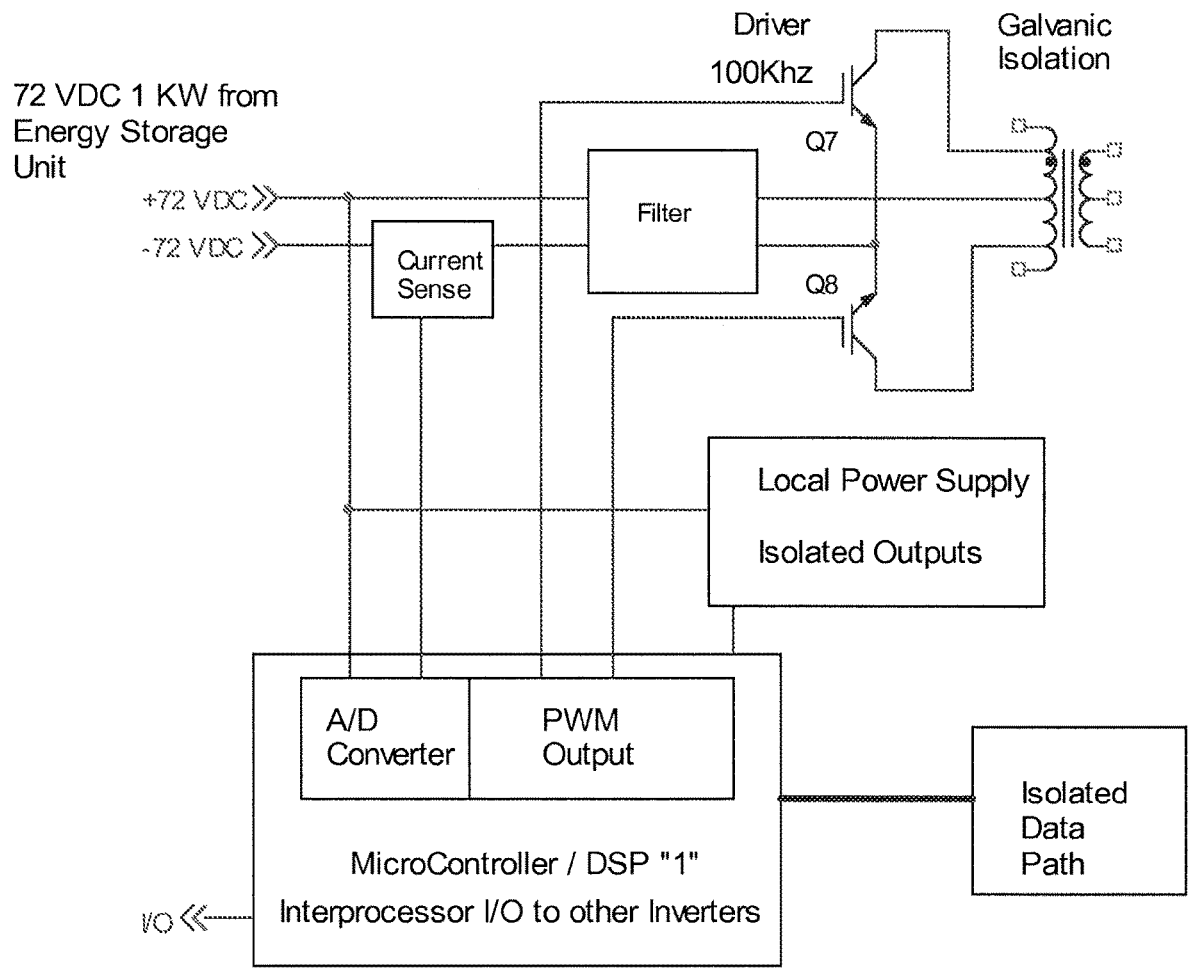
FIG. 15 shows a DC-DC converter driver stage.
Figure 16:
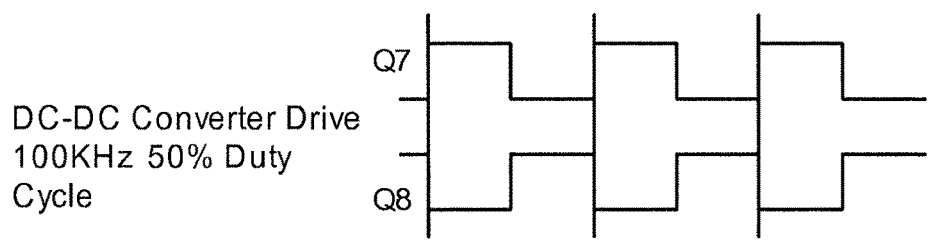
FIG. 16 shows an example of a drive waveform for Q7, Q8.

FIG. 15 shows an example of a DC-DC converter driver stage in accordance with an additional embodiment of the invention. A DC input may be provided to the DC-DC converter stage. Q7 and Q8 may be driving an isolation transformer, and may form a push-pull driver. FIG. 16 shows an example of a drive waveform for Q7, Q8 in this configuration. In some embodiments, the drive waveform may be at a 50% duty cycle, although other duty cycles may be provided. In some instances, the waveform for Q7 may be the inverted waveform for Q8. The DC-DC converter stage may also include a local power supply, which may optionally provide isolated outputs to a DSP and/or signal from the DC input. In some instances, a filter may be provided as well. Input voltage and/or current may be monitored and the data may be stored in a DSP. The DSP may provide a pulse width modulation (PWM) output, which may be directed to Q7 and Q8, and provide a drive waveform for each. The DSP may or may not consider the input voltage and/or current in providing the PWM output.

Figure 17:
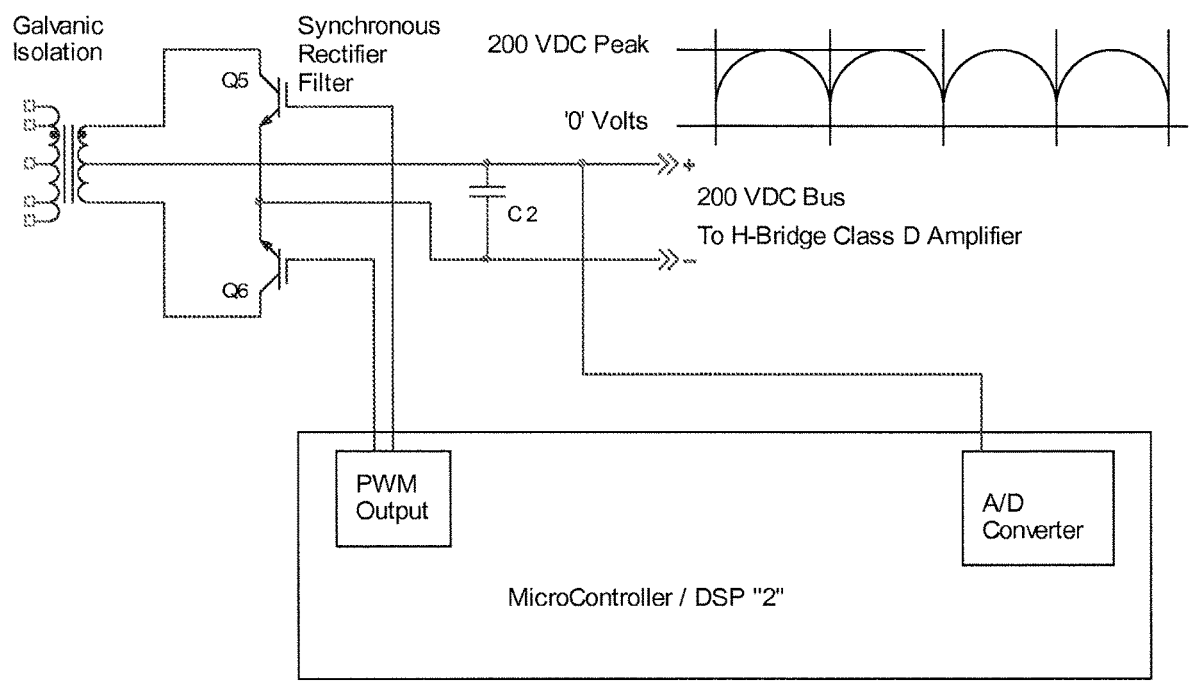
FIG. 17 shows a DC-DC converter synchronous rectifier stage.
Figure 18:
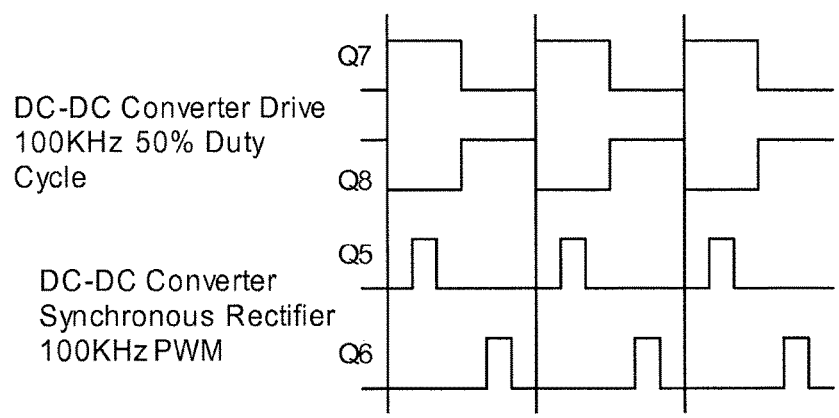
FIG. 18 shows an example of a timing relationship between drivers Q7, Q8 and rectifiers Q5 and Q6.
Figure 19:
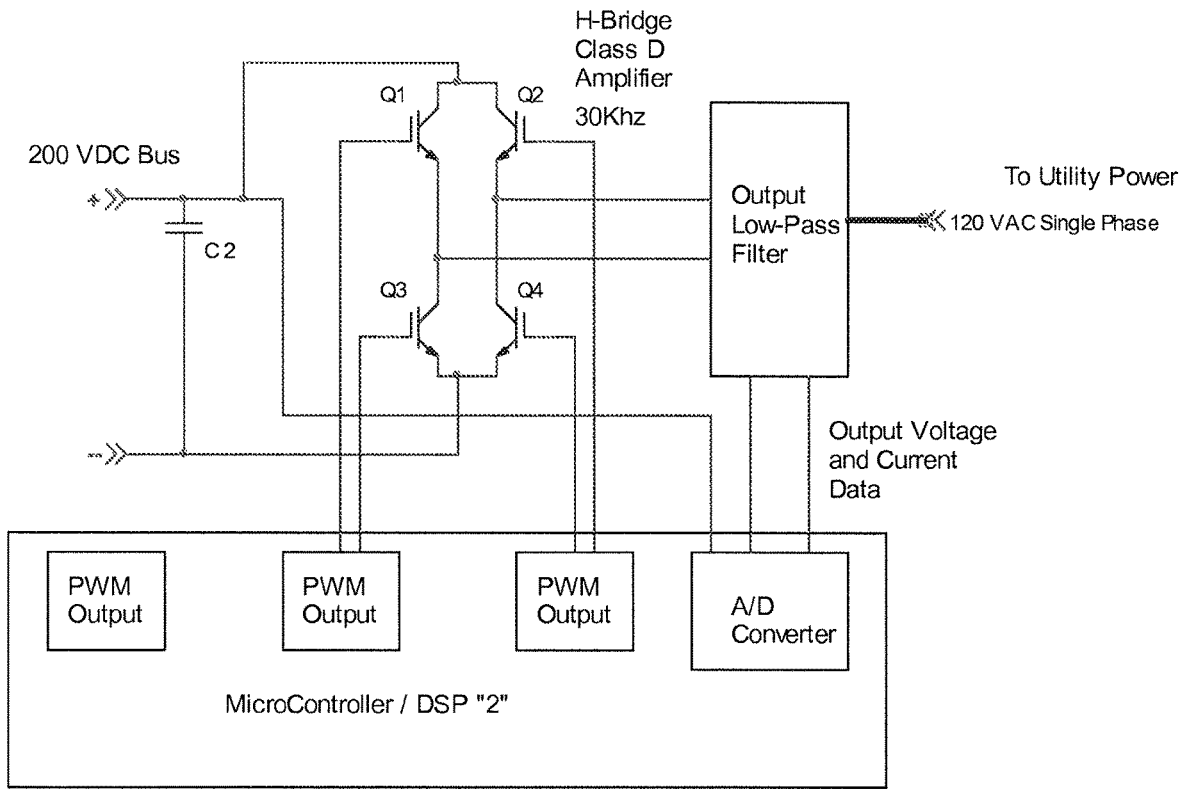
FIG. 19 shows an "H" bridge AC output stage.
Figure 20:
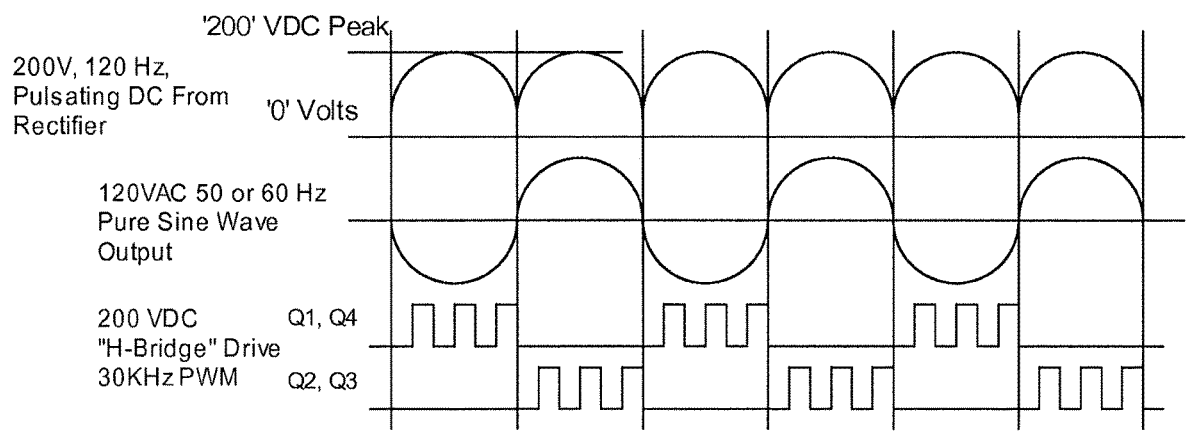
FIG. 20 shows an example of timing relationships for an "H" Bridge output stage.

FIG. 17 shows a DC-DC converter synchronous rectifier stage. The synchronous rectifier stage may include Q5 and Q6, which may receive a PWM output from a second DSP. The pulses to Q5 and Q6 may control the voltage on a bus across a capacitor. The voltage from the bus may be inputted to the DSP, through the A/D converter of the DSP. Such data may or may not be utilized by the DSP to control the PWM output at this stage or another stage. Q5 and Q6 may form a synchronous rectifier that operates at a given frequency. In some embodiments, the operation frequency for Q5 and Q6 may be synchronized with the frequency for Q7 and Q8. A second DSP, (e.g., DSP 2), may maintain synchronization with the AC line frequency and this may be used to both regulate and synchronize the 120 Hz pulsating DC and to regulate and synchronize the output from an "H" Bridge amplifier. FIG. 18 shows an example of a timing relationship between drivers Q7, Q8 and rectifiers Q5 and Q6. The frequency of the pulses for Q5 and Q6 may be synchronized with Q7 and Q8. The pulse widths of Q5 and Q6 may be controlled to produce a desired output FIG. 19 shows an "H" bridge AC output stage. The "H" bridge may receive a DC from a prior stage. Preferably, the DC received may be a half wave pulsating DC. The "H" bridge may also include Q1-Q4, which may receive PWM outputs from a DSP. The DSP may control the drive signals provided to the "H" bridge. From this, the "H" bridge may provide an AC output. The "H" bridge output stage may operate as a class "D" amplifier. Depending on the desired output, the bridge may provide a PWM frequency to produce a desired frequency output. The input voltage to the "H" bridge may be synchronized by the rectifier. FIG. 20 shows an example of timing relationships for an "H" Bridge output stage. The drive signals, Q1-Q4 may be pulse width modulated as shown in FIG. 20. The pulsating DC may be provided as a half sine wave. The pulsating DC may also be provided to the "H" bridge. The output from the "H" bridge may pass through a low pass filter, to result in a pure or substantially pure sine wave output.

B. Charge Mode

Figure 21:
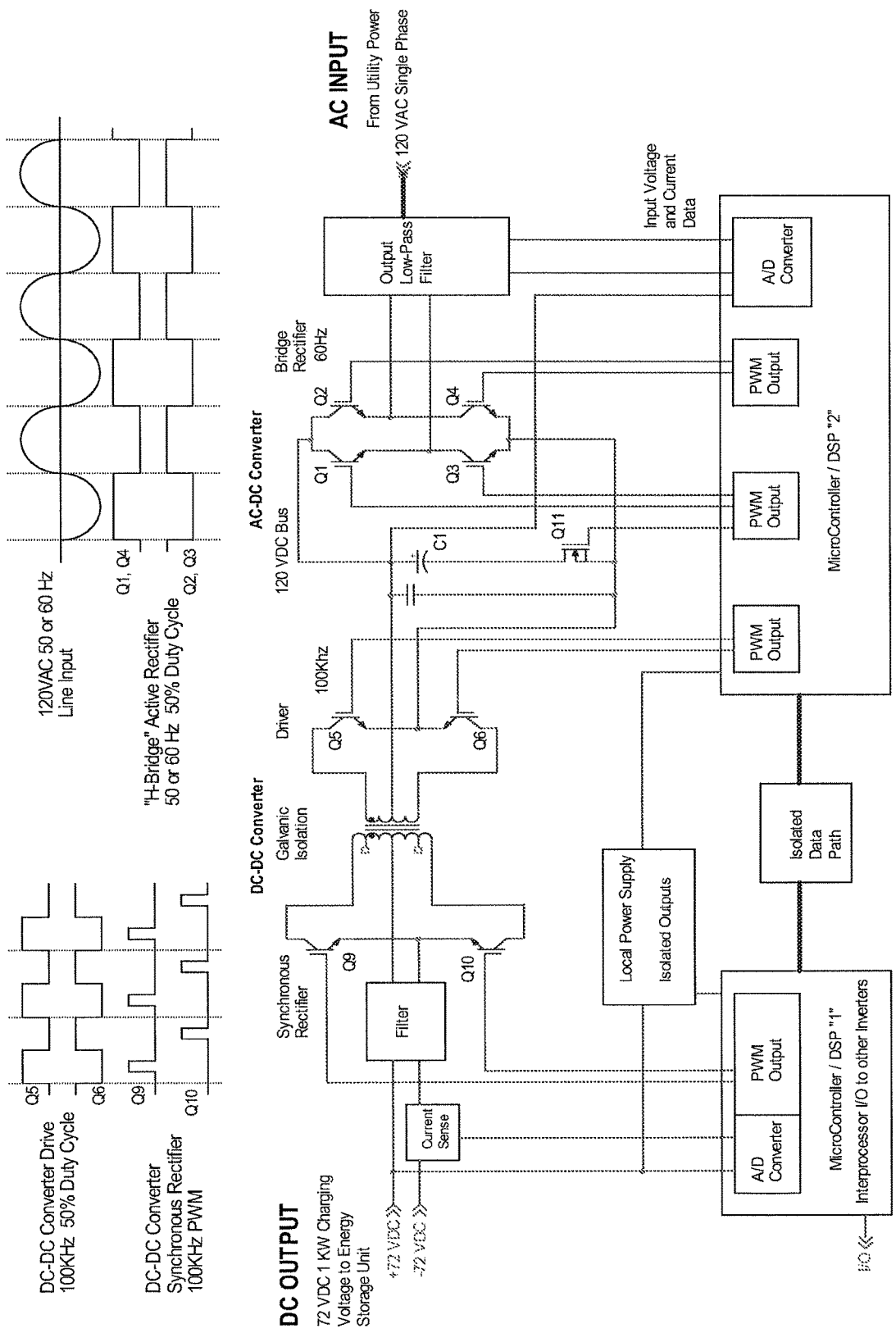
FIG. 21 shows a functional block diagram for a charge mode.

FIG. 21 shows a functional block diagram for a charge mode in accordance with an alternate embodiment. An AC input may be provided, as well as a DC output. The bidirectional converter may include an AC-DC rectifier stage, a DC-DC converter stage, and a DC output stage.

Figure 22:
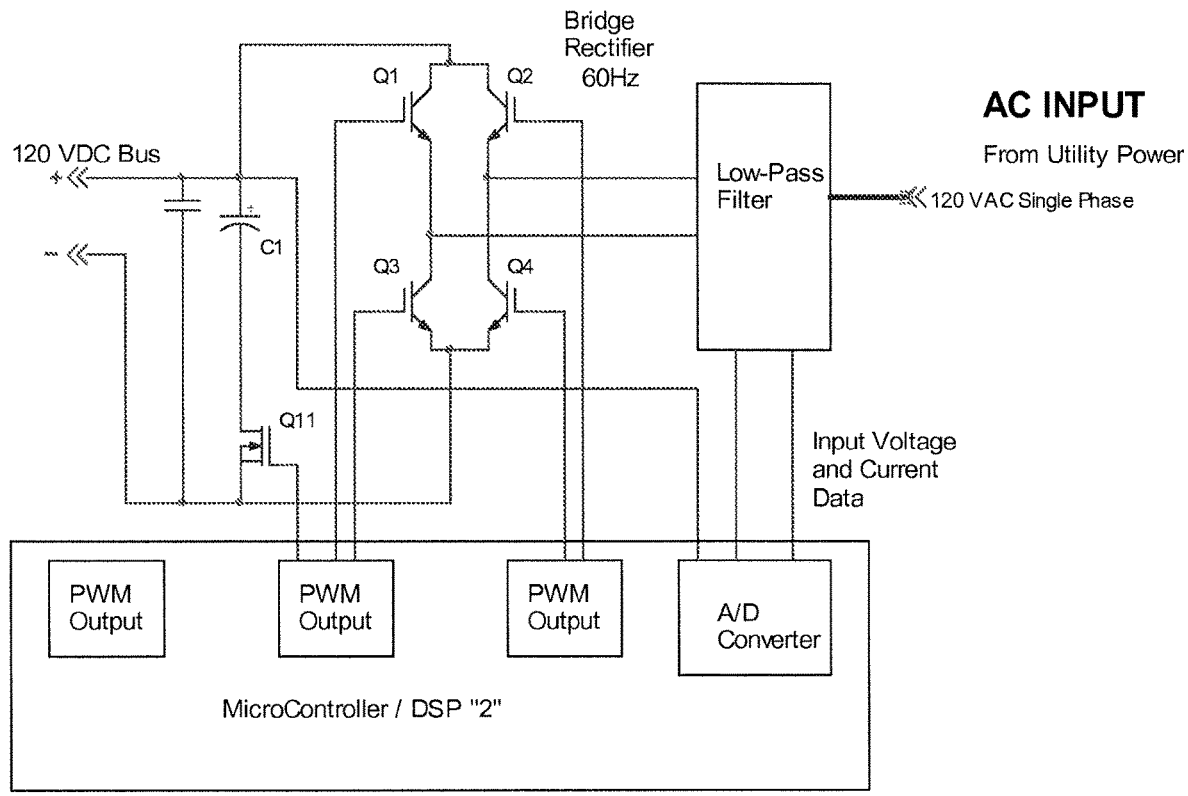
FIG. 22 shows an example of where Q1-Q4 may reverse roles and serve as a bridge rectifier.
Figure 23:
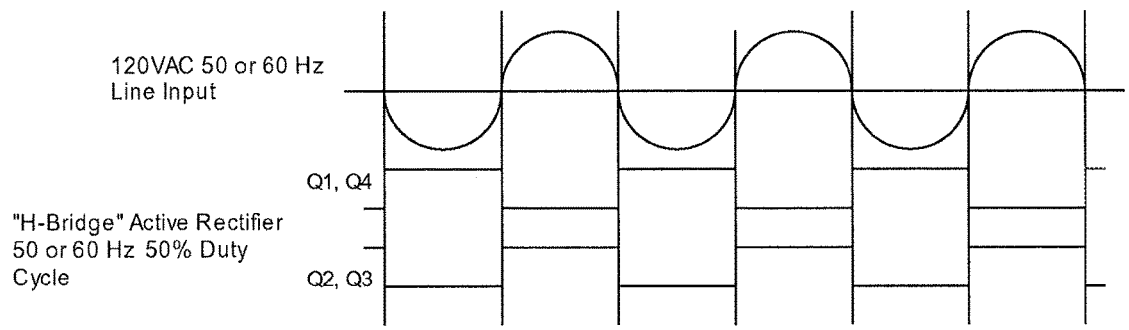
FIG. 23 shows an example of rectifier timing.

FIG. 22 shows an example of where Q1-Q4 may reverse roles and serve as a bridge rectifier. The AC-DC rectifier stage may include an "H" bridge. The "H" bridge may be a rectifier operating at a specified frequency, which may be under software control. Furthermore, under software control, the "H" bridge may be turned into a full wave bridge rectifier by taking the AC line voltage, rectifying it, and applying the voltage to a capacitor C1. The capacitor C1 may be enabled for the charge mode, optionally by Q11. In some instances, C1 is not enabled for the AC generation mode. The bidirectional converter may implement power factor correction of the power used in the battery charger mode. Such power factor correction may be realized because the system can also monitor the voltage and phase of the input voltage and current, may have sufficient processing power in the DSP, and may have full PWM software control over the rectifier configuration. Q1-Q4 and Q11 may receive PWM outputs from one or more DSP, such as DSP 2. DSP 2 may thus control the "H" bridge DC output. FIG. 23 shows an example of rectifier timing. An AC line input may be provided as a sine wave. The rectifier pulses may be provided as shown. Q1-Q4 may be synchronized with the line input to match frequency.

Figure 24:
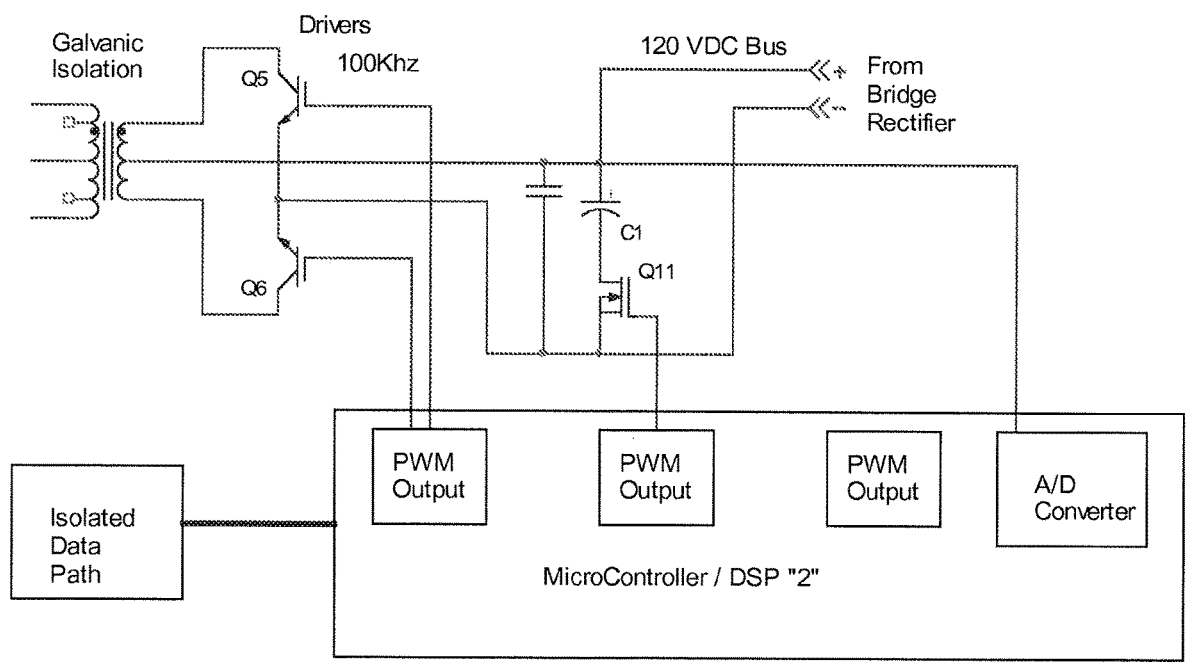
FIG. 24 shows a DC to DC converter driver stage.
Figure 25:
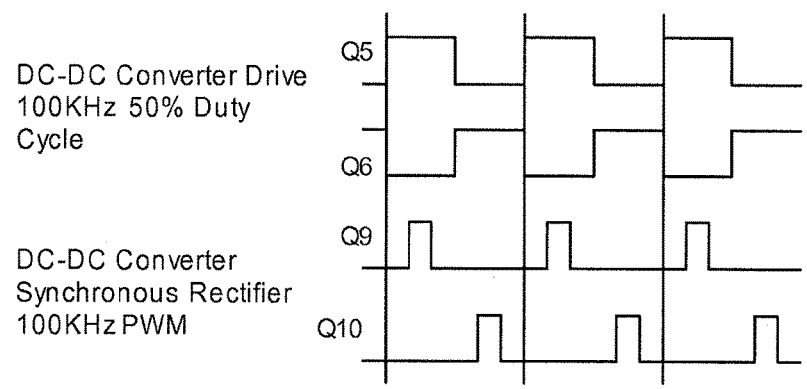
FIG. 25 shows an example of a timing relationship for Q5, Q6, Q9, and Q10.

FIG. 24 shows a DC to DC converter driver stage. Q5 and Q6 may now serve as the drivers for the DC to DC converter in the reverse direction provided by the charge mode. Q5 and Q6 may operate at a desired frequency and duty cycle, and may be controlled by the PWM output provided by a DSP. The same DSP, or another DSP, may also provide a PWM output to control Q11. Q11 may determine whether a capacitor C1 is on as part of the system or not. In some embodiments, Q11 may keep capacitor C1 on at all times in the charge mode. The same DSP, or another DSP, may also receive a signal from the transformer through the A/D converter. The signal may or may not affect the PWM outputs provided by the DSP or related DSP. FIG. 25 shows an example of a timing relationship for Q5, Q6, Q9, and Q10. Q5 and Q6 may receive pulse width modulation from a DSP (e.g., DSP 2), and Q9 and Q10 may receive PWM output from another DSP (e.g., DSP 1). Q9 and Q10 may be synchronized to Q5 and Q6 so that they share the same frequency. In some implementations, the duty cycles of Q9 and Q10 may be lower than the duty cycles for Q5 and Q6. The duty cycles of Q9 and Q10 may be software controlled to provide the desired DC output.

Figure 26:
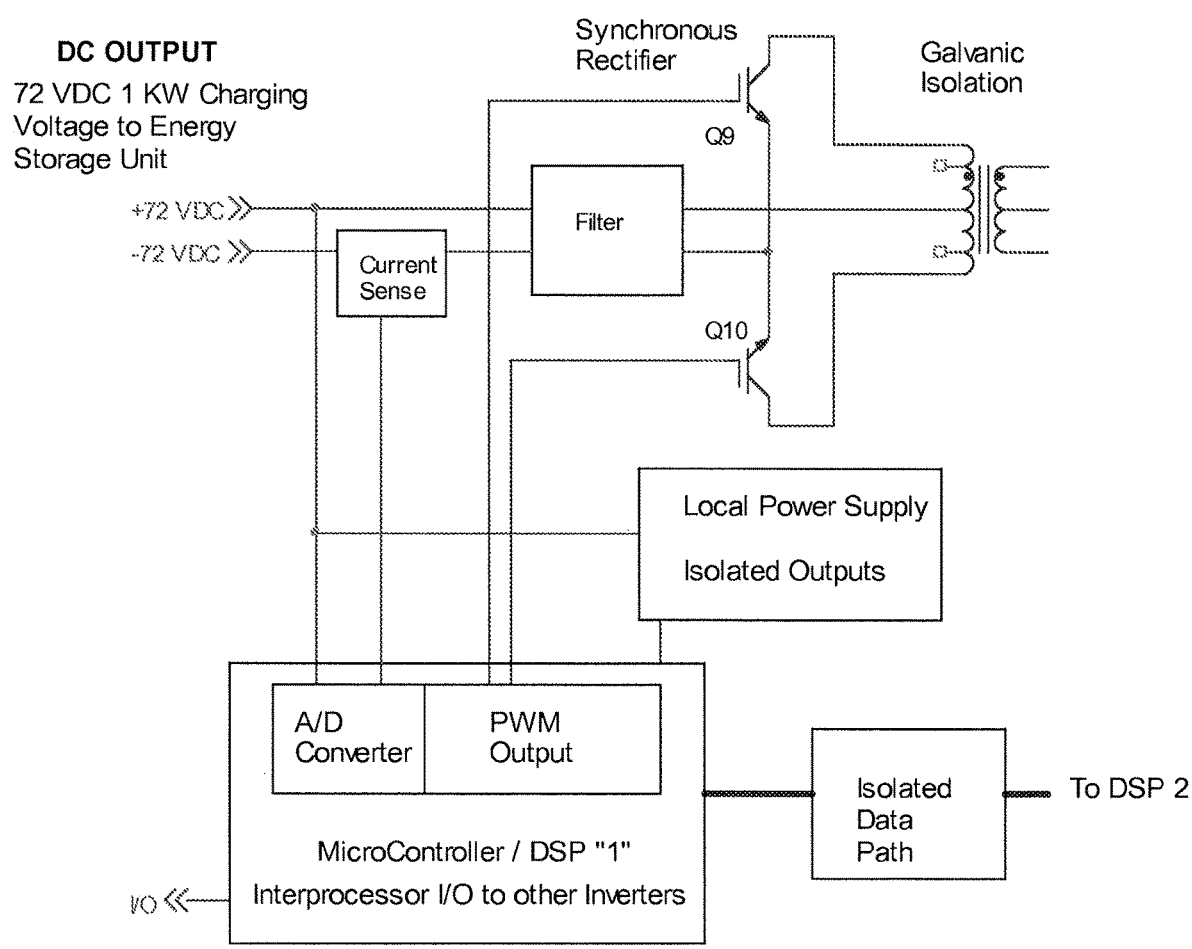
FIG. 26 shows a DC output stage to a battery.

FIG. 26 shows a DC output stage to a battery. Synchronous rectifiers Q9 and Q10 may be pulse width modulated (PWM) at a desired frequency and duty cycle to provide the correct voltage and current, per a software charging algorithm, to a battery, capacitor, ultra-capacitor, energy storage system, or DC-current receiver. A current sense may provide information about sensed current to the DSP through an A/D converter. The DSP may utilize this information in providing the PWM output to Q9 and Q10. Thus, feedback from synchronous rectifiers may be used in controlling the synchronous rectifiers to yield a desirable output. This may be advantageous over traditional systems, which had problems from using synchronous rectifiers in DC-DC converters that were in parallel with each other. A filter may be provided in accordance with an embodiment of the invention. In a charge mode, the filter eliminates high frequency noise in the output of the DC to DC converter, preventing this noise from being conducted into the battery bus circuit. A software charging algorithm may receive the information provided by the current sense, and provide a PWM output. The control algorithm may reside on the DSP, or may reside elsewhere on a system that may communicate with the DSP.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A battery charger comprising:
   one or more synchronous rectifiers that provide a voltage and current;
   a DC to DC converter driver stage;
   a current sense configured to sense current between a battery and the DC to DC converter driver stage; and
   a digital signal processor separate from the current sense, the digital signal processor configured to:
   provide a pulse width modulated output to the one or more synchronous rectifiers, and
   receive current sensing data from the current sense, wherein the digital signal processor controls the pulse width modulated output to achieve a desired voltage and current based on the received current sensing data.

2. The battery charger of claim 1 comprising a plurality of digital signal processors.

3. The battery charger of claim 2 wherein the pulse width modulated output controls the voltage on a bus across a capacitor.

4. The battery charger of claim 3 wherein the voltage on the bus is inputted to a second digital signal processor and relied upon by the second digital signal processor to control the pulse width modulated output.

5. The battery charger of claim 1, further comprising a filter that eliminates high frequency noise from the output of the DC to DC converter drive stage when the battery charger is operating in a charge mode, and that isolates noise and electrical transients generated in the DC to DC converter driver stage from being reflected to a battery bus circuit when the battery charger is operating in an inverter mode.

6. The battery charger of claim 2 wherein an isolated data path is provided between the plurality of digital signal processors.

7. The battery charger of claim 1 wherein the one or more synchronous rectifiers utilizes a switchable filter to provide the voltage and current.

8. A battery charger comprising:
   one or more synchronous rectifiers that provide a voltage and current;
   a current sense configured to sense current into or out of a battery;
   a digital signal processor configured to provide a pulse width modulated output to the one or more synchronous rectifiers and receive current sensing data from the current sense, wherein the digital signal processor controls the pulse width modulated output to achieve a desired voltage and current based on the received current sensing data;
   a DC to DC converter driver stage; and
   a filter that eliminates high frequency noise from the output of the DC to DC converter drive stage when the battery charger is operating in a charge mode and that isolates noise and electrical transients generated in the DC to DC converter driver stage from being reflected to a battery bus circuit when the battery charger is operating in an inverter mode.

* * * * *